(12) United States Patent
Bianchi et al.

(10) Patent No.: US 7,068,906 B2
(45) Date of Patent: Jun. 27, 2006

(54) FIXTURE FOR SYSTEM FOR PROCESSING FIBER OPTIC CONNECTORS

(75) Inventors: Robert J. Bianchi, Minneapolis, MN (US); Larry Sorenson, New Prague, MN (US); Todd Eichinger, Loveland, CO (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 10/890,528

(22) Filed: Jul. 12, 2004

(65) Prior Publication Data
US 2005/0276543 A1    Dec. 15, 2005

Related U.S. Application Data

(60) Provisional application No. 60/579,755, filed on Jun. 14, 2004.

(51) Int. Cl.
*G02B 6/00* (2006.01)
(52) U.S. Cl. .......................... 385/134; 385/53; 451/15; 451/66; 451/287
(58) Field of Classification Search ................ 385/53, 385/134–138; 451/14, 15, 66, 82, 111, 112, 451/287, 420
See application file for complete search history.

(56) References Cited

U.S. PATENT DOCUMENTS

| | | |
|---|---|---|
| 2,577,312 A | 12/1951 | Donahue |
| 3,868,794 A | 3/1975 | Zitkus |
| 4,291,502 A | 9/1981 | Grimsby et al. |
| 4,498,260 A | 2/1985 | Doty |
| 4,587,768 A | 5/1986 | Doyle |
| 4,649,670 A | 3/1987 | Snyder |
| 4,693,035 A | 9/1987 | Doyle |
| 4,709,512 A | 12/1987 | Okubo et al. |
| 4,802,680 A | 2/1989 | Fuchs |
| 4,819,386 A | 4/1989 | Struyf |
| 4,831,784 A | 5/1989 | Takahashi |
| 4,832,435 A | 5/1989 | Suzuki et al. |
| 4,850,152 A | 7/1989 | Heynacher et al. |
| 4,891,916 A | 1/1990 | Rhoades et al. |
| 4,905,415 A | 3/1990 | Moulin |
| 4,944,079 A | 7/1990 | Nakamura et al. |
| 4,979,334 A | 12/1990 | Takahashi |
| 5,107,627 A | 4/1992 | Mock, Jr. et al. |

(Continued)

FOREIGN PATENT DOCUMENTS

DE    40 04 665 A1    8/1991

(Continued)

OTHER PUBLICATIONS

"ADC FasTerm® Singlemode UPC and Multimode LX.5® Connector Installation Instructions," *ADC Telecommunications, Inc.*, Issue 2, pp. 1-26 (May 2002).

(Continued)

*Primary Examiner*—John D. Lee
*Assistant Examiner*—Rhonda S. Peace
(74) *Attorney, Agent, or Firm*—Merchant & Gould P.C.

(57) ABSTRACT

A fixture for an automated connectorization system for processing fiber optic connectors. The fixture can include a first and second portions configured to hold the connectors. The first portion can include a plurality of clamps, each clamp being configured to clamp onto one of the connectors. The second portion can include a plurality of nests, each nest including an aperture configured to allow a ferrule of one of the connectors to extend therethrough. The second portion of the fixture is coupled to the first portion.

17 Claims, 34 Drawing Sheets

U.S. PATENT DOCUMENTS

| | | | |
|---|---|---|---|
| 5,136,820 A | 8/1992 | Luther | |
| 5,184,433 A | 2/1993 | Maack | |
| 5,201,148 A | 4/1993 | Rupert et al. | |
| 5,216,846 A | 6/1993 | Takahashi | |
| 5,218,786 A | 6/1993 | Takahashi | |
| 5,265,381 A | 11/1993 | Takahashi | |
| 5,281,884 A | 1/1994 | Basavanhally et al. | |
| 5,317,663 A | 5/1994 | Beard et al. | |
| 5,321,917 A * | 6/1994 | Franklin et al. | 451/386 |
| 5,345,323 A | 9/1994 | Basavanhally et al. | |
| 5,349,784 A | 9/1994 | Grois et al. | |
| 5,351,445 A | 10/1994 | Takahashi | |
| 5,403,227 A | 4/1995 | Franklin et al. | |
| 5,447,464 A | 9/1995 | Franklin et al. | |
| 5,458,528 A | 10/1995 | Lurie et al. | |
| 5,458,531 A | 10/1995 | Matsuoka et al. | |
| 5,461,689 A | 10/1995 | Matsuoka et al. | |
| 5,516,328 A | 5/1996 | Kawada | |
| 5,547,418 A | 8/1996 | Takahashi | |
| 5,556,323 A | 9/1996 | Luther et al. | |
| 5,559,916 A | 9/1996 | Terao et al. | |
| 5,577,149 A | 11/1996 | Averbeck et al. | |
| 5,601,474 A | 2/1997 | Takahashi | |
| 5,643,064 A | 7/1997 | Grinderslev et al. | |
| 5,667,426 A | 9/1997 | Minami et al. | |
| 5,674,114 A | 10/1997 | Miller et al. | |
| 5,711,707 A | 1/1998 | Grinderslev et al. | |
| 5,720,653 A | 2/1998 | Miller et al. | |
| 5,741,171 A | 4/1998 | Sarfaty et al. | |
| 5,743,787 A | 4/1998 | Ishiyama et al. | |
| 5,813,902 A | 9/1998 | Wiegand | |
| 5,947,797 A | 9/1999 | Buzzetti | |
| 6,077,154 A | 6/2000 | Takashi et al. | |
| 6,106,368 A | 8/2000 | Childers et al. | |
| 6,110,013 A | 8/2000 | Minami et al. | |
| 6,113,469 A | 9/2000 | Yoshikawa et al. | |
| 6,126,519 A | 10/2000 | Minami et al. | |
| 6,157,863 A | 12/2000 | Chandler et al. | |
| 6,165,055 A | 12/2000 | Takahashi et al. | |
| 6,183,343 B1 | 2/2001 | Buzzetti | |
| 6,190,239 B1 | 2/2001 | Buzzetti | |
| 6,257,971 B1 | 7/2001 | Takahashi et al. | |
| 6,276,842 B1 | 8/2001 | Xu et al. | |
| 6,280,293 B1 | 8/2001 | Minami et al. | |
| 6,302,763 B1 | 10/2001 | Buzzetti | |
| 6,302,773 B1 | 10/2001 | Kato et al. | |
| 6,347,974 B1 | 2/2002 | Chandler et al. | |
| 6,396,996 B1 | 5/2002 | Carpenter et al. | |
| 6,428,215 B1 | 8/2002 | Nault | |
| 6,599,030 B1 | 7/2003 | Millmann | |
| 6,698,937 B1 * | 3/2004 | Grimes et al. | 385/53 |
| 6,718,111 B1 | 4/2004 | Suek et al. | |
| 6,817,931 B1 * | 11/2004 | Minami | 451/270 |
| 6,827,632 B1 | 12/2004 | Zimmel et al. | |
| 6,831,738 B1 | 12/2004 | Rogers et al. | |
| 6,860,646 B1 * | 3/2005 | Suek et al. | 385/85 |
| 6,918,816 B1 | 7/2005 | Bianchi | |
| 2001/0023164 A1 | 9/2001 | Minami et al. | |
| 2002/0160700 A1 | 10/2002 | Boyer et al. | |
| 2003/0031447 A1 | 2/2003 | Nault | |

FOREIGN PATENT DOCUMENTS

| | | |
|---|---|---|
| DE | 197 52 228 A1 | 5/1998 |
| EP | 0 579 056 A1 | 1/1994 |
| EP | 0 621 107 A1 | 10/1994 |
| JP | 59-161256 | 9/1984 |
| JP | 60-217055 | 10/1985 |
| JP | 61-113005 | 5/1986 |
| JP | 63-283854 | 11/1988 |
| JP | 63-316811 | 12/1988 |
| JP | 5-19140 | 1/1993 |
| JP | 5-157941 | 6/1993 |
| JP | 5-164942 | 6/1993 |
| JP | 6-138343 | 5/1994 |
| SU | 738825 | 6/1980 |
| WO | WO 98/14810 | 4/1998 |
| WO | WO 03/023537 A1 | 3/2003 |

OTHER PUBLICATIONS

"SFP-550," *Seikoh Giken USA*, 2 pages (2004).
"MCP 24 Fixture Plates," *Nanometer Technologies*, 1 page (visited May 24, 2004).
"Fiber Optic," *Nanometer Technologies*, 1 page (visited May 24, 2004).
"MCP 24 Figure 8 Polishing," *Nanometer Technologies*, 1 page (visited May 24, 2004).
"MCP 24 Universal Polishing Fixture," *Nanometer Technologies*, 1 page (visited May 24, 2004).
"MCP 24 Advantages and Specs," *Nanometer Technologies*, 1 page (visited May 24, 2004).
"MCP 24 Mass Connector Polisher," *Nanometer Technologies*, 1 page (2004).
"MCP 24 Mass Connector Polisher—Technical Information," *Nanometer Technologies*, 1 page (2004).
"MCP 24 Fixture Plates," *Nanometer Technologies*, 1 page (2004).
U.S. Appl. No. 10/356,358, Apparatus and Method for Polishing a Fiber Optic Connector, filed Jan. 31, 2003.

* cited by examiner

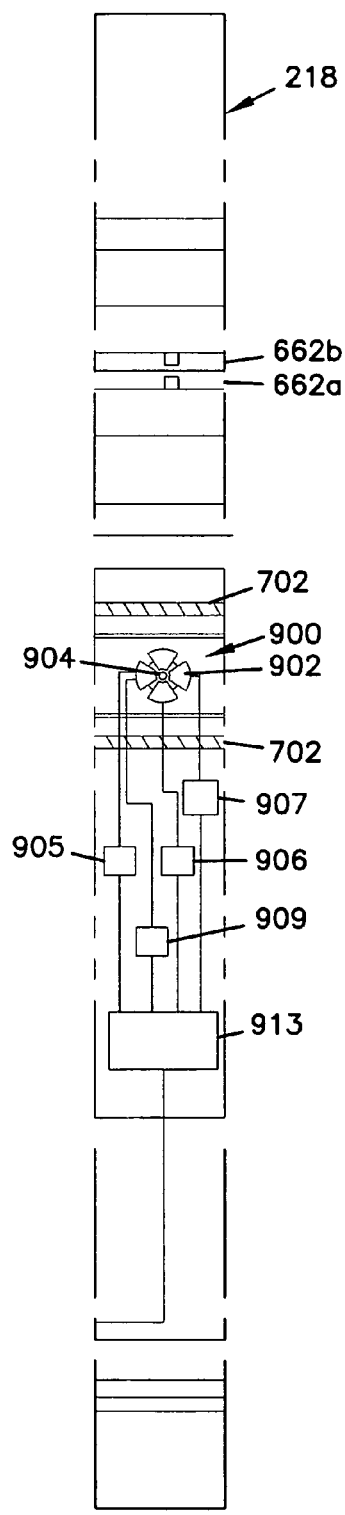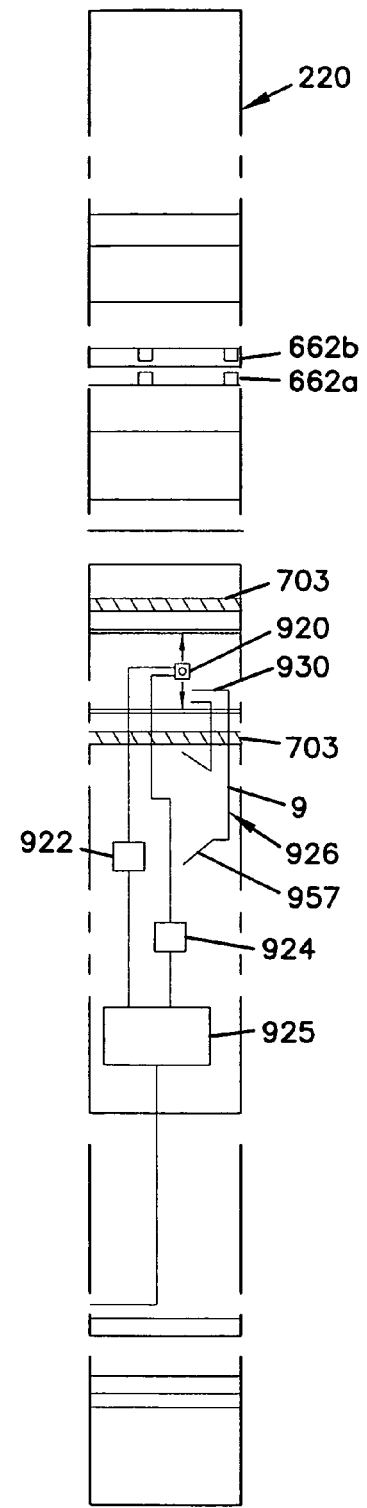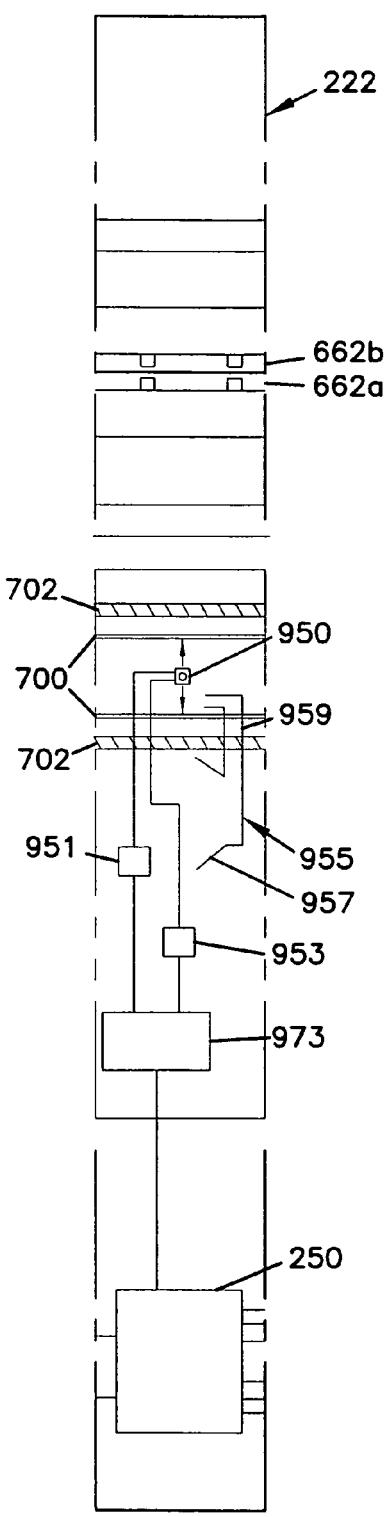

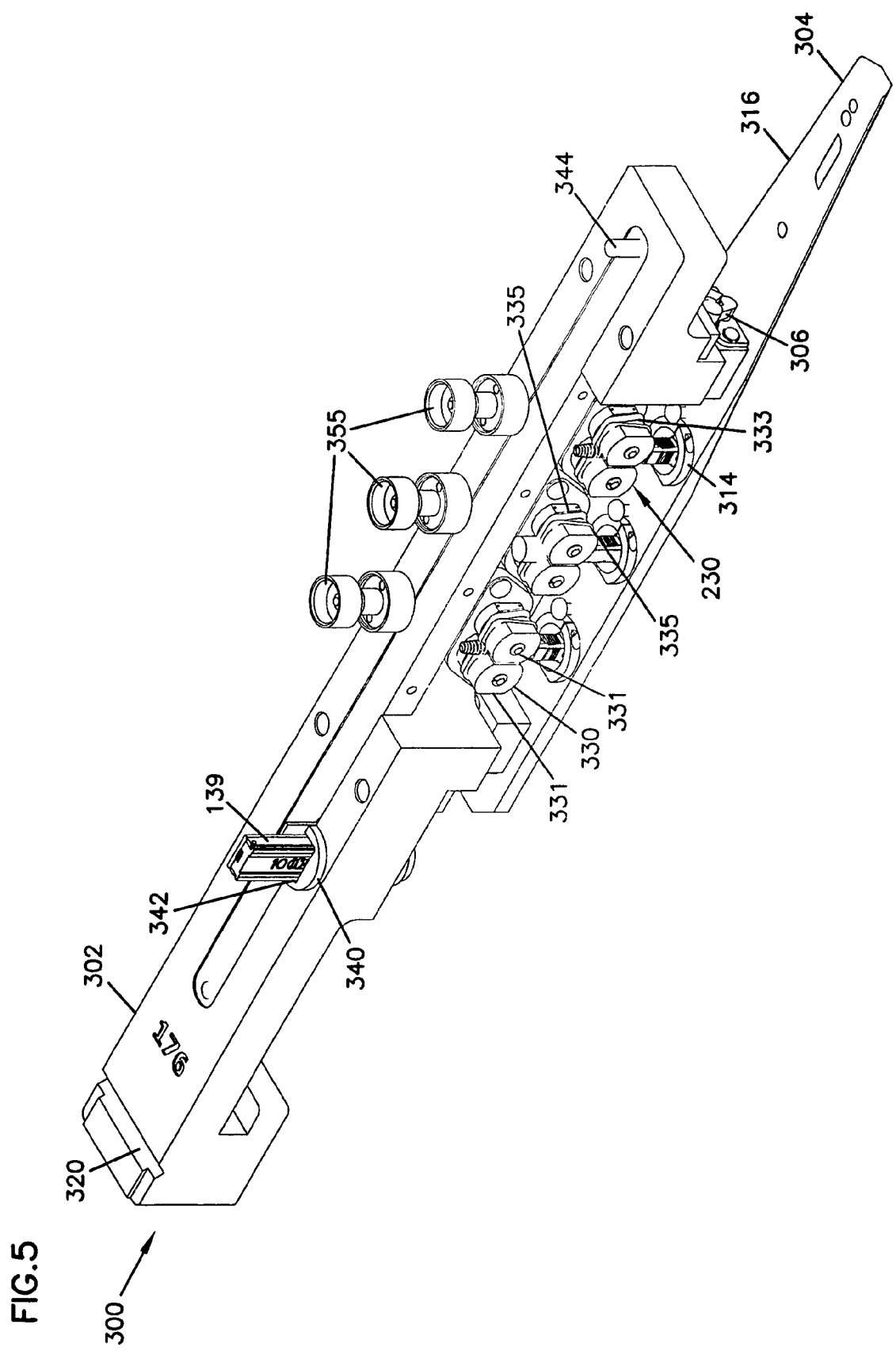

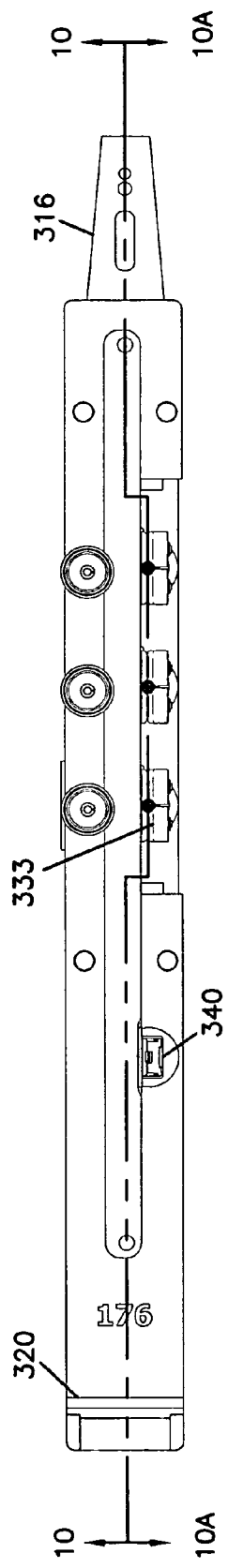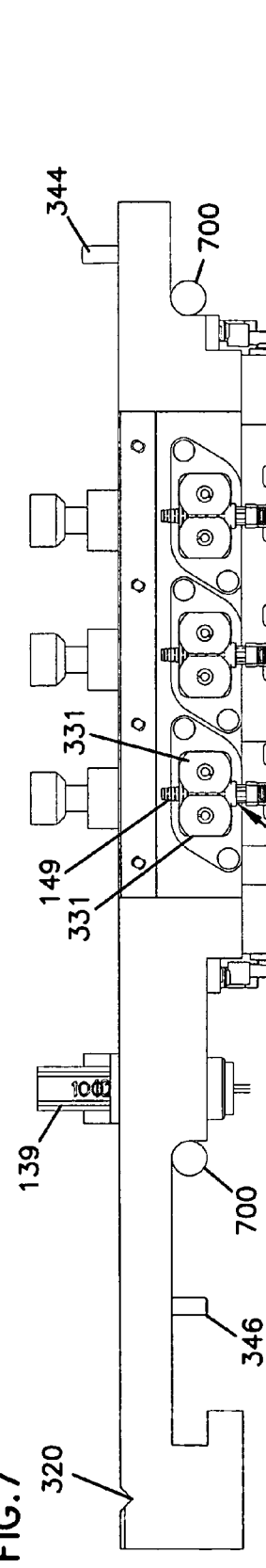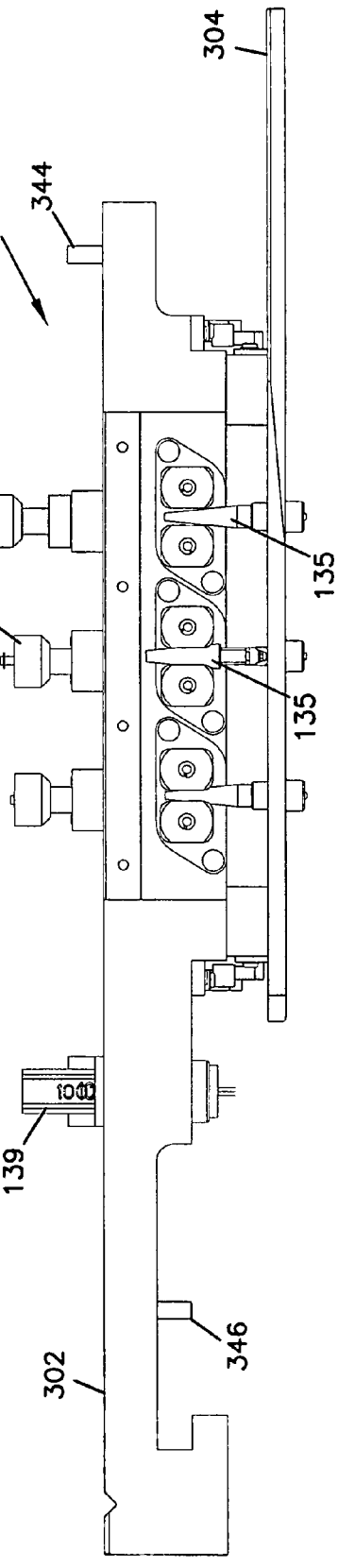

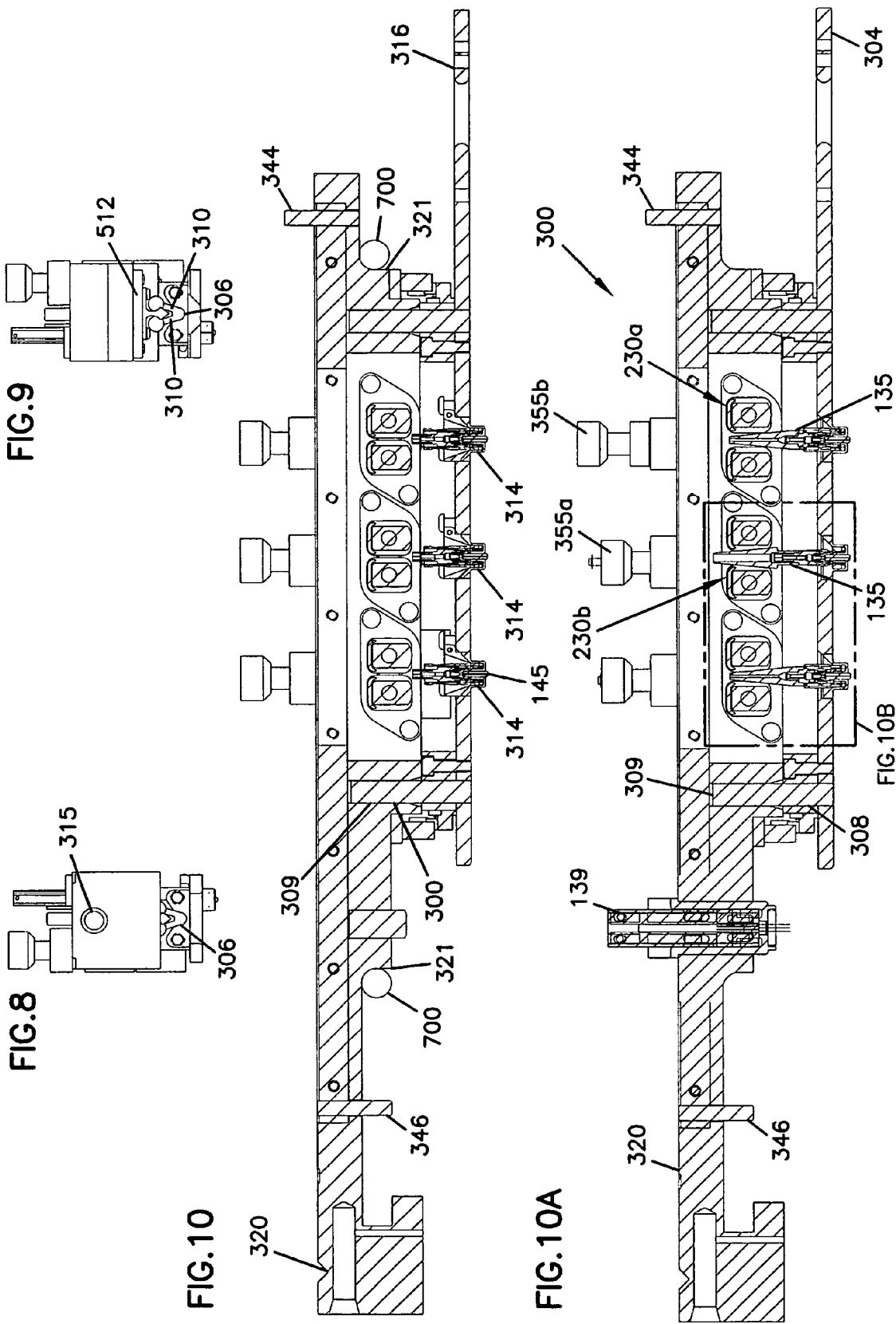

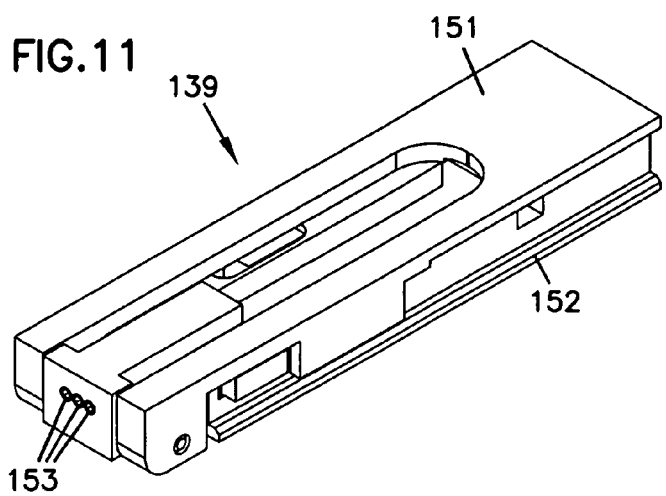
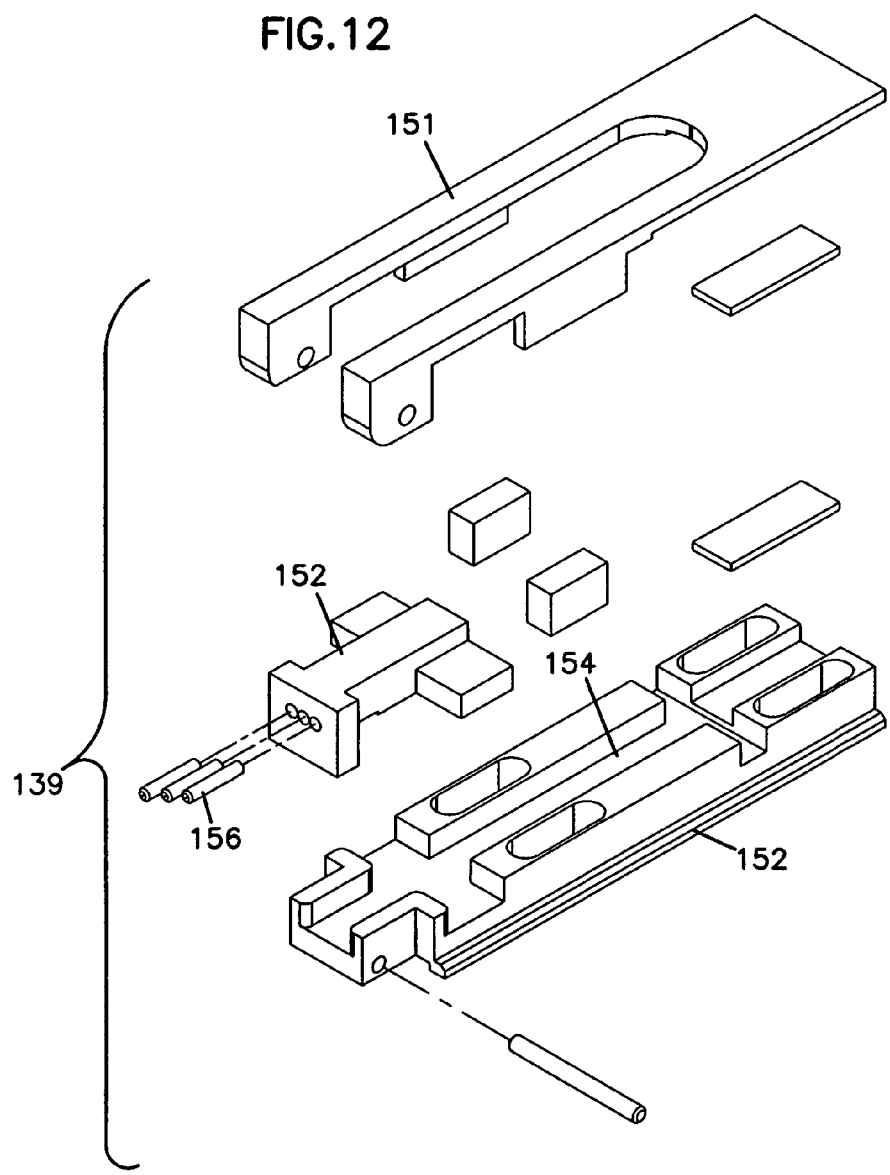

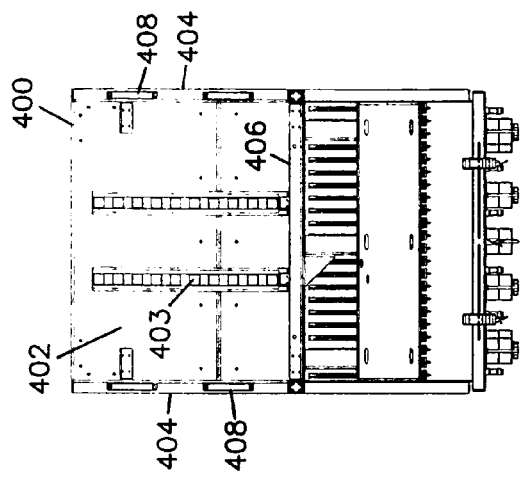
FIG. 16
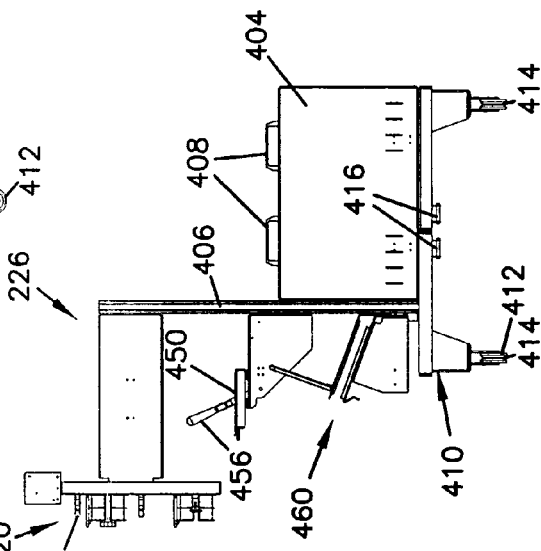
FIG. 15
FIG. 14
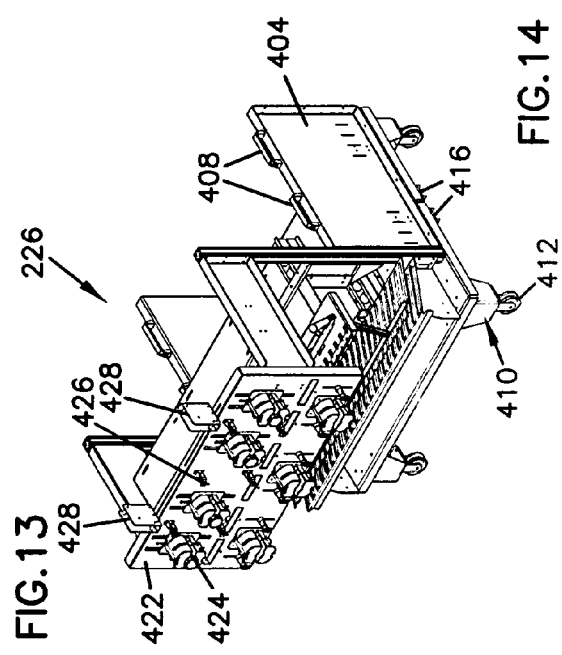
FIG. 13

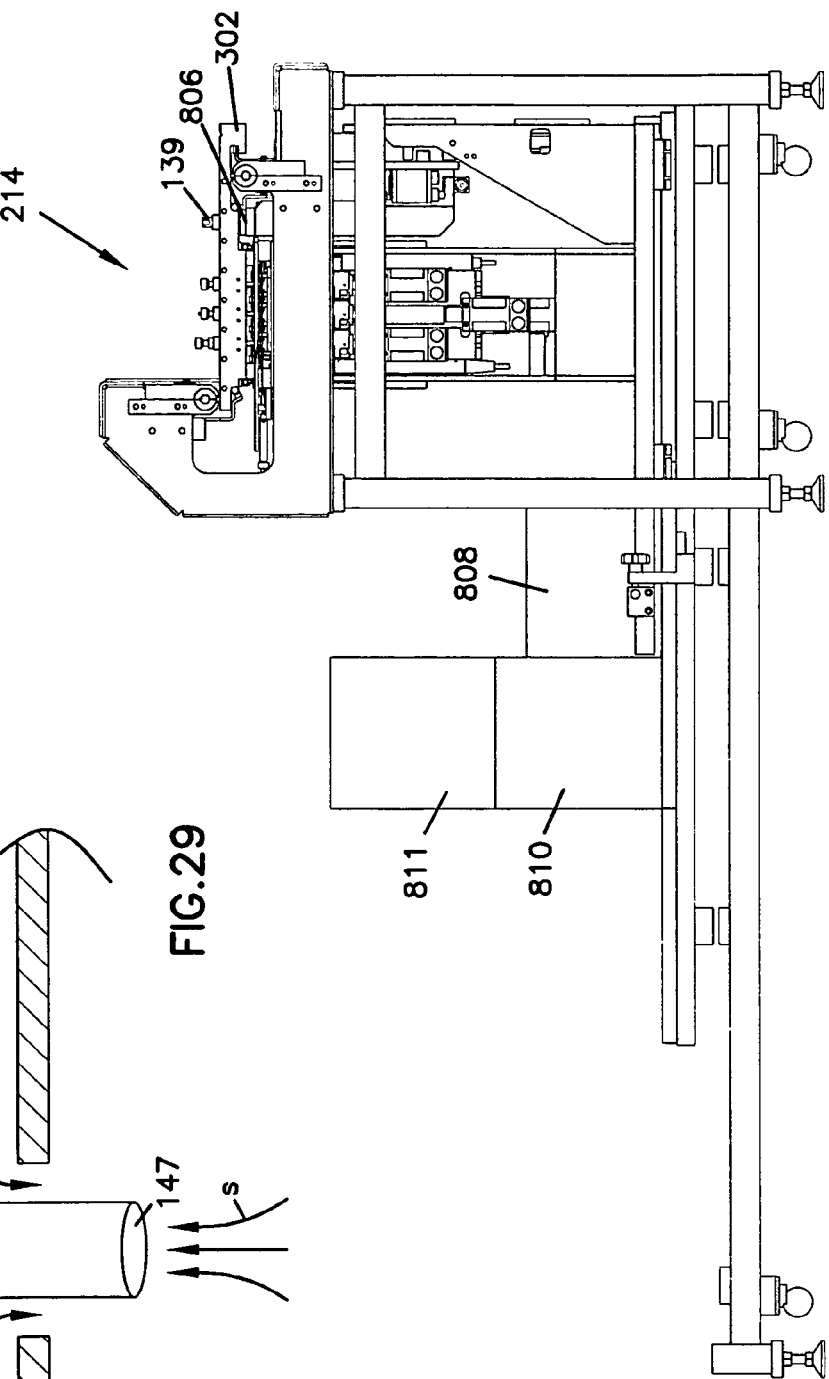
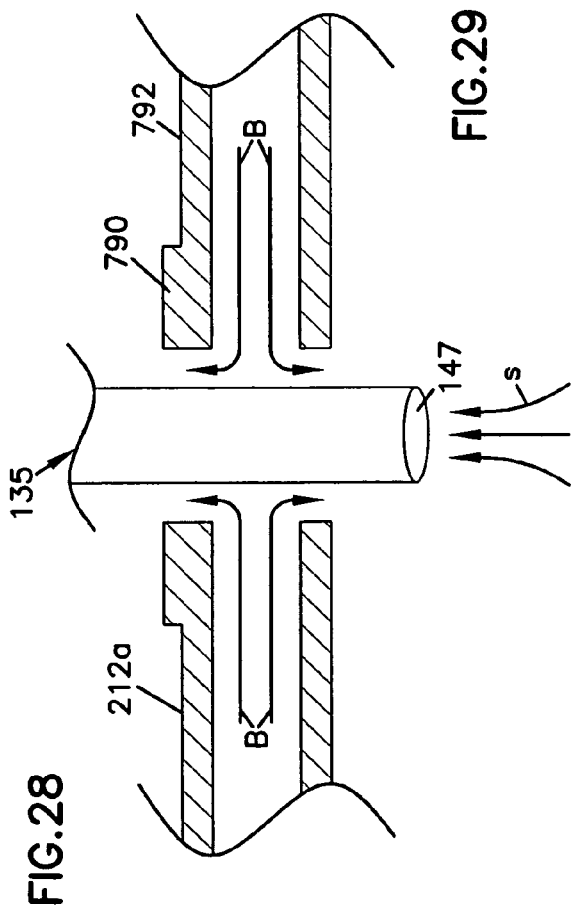
FIG.28
FIG.29

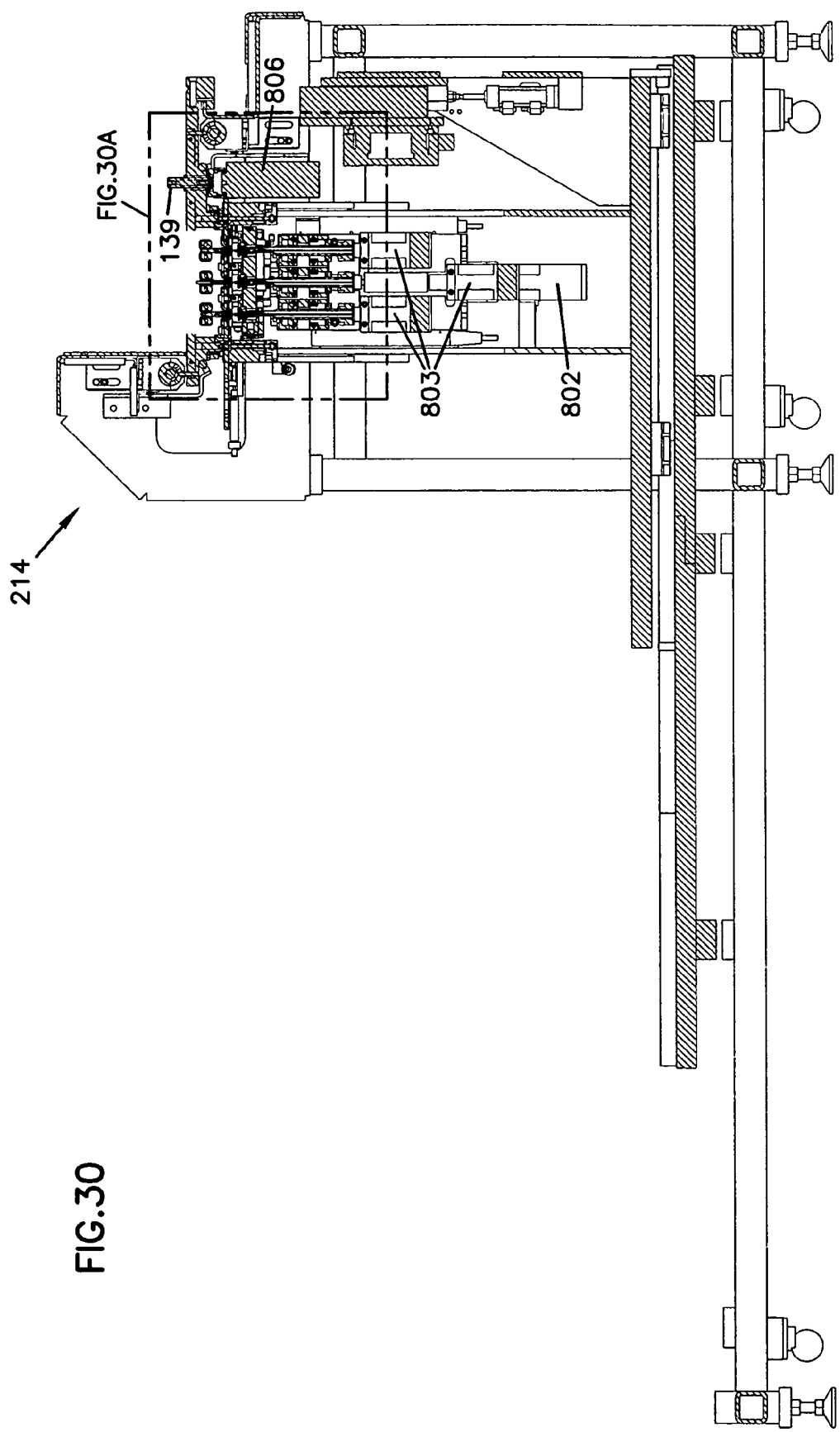

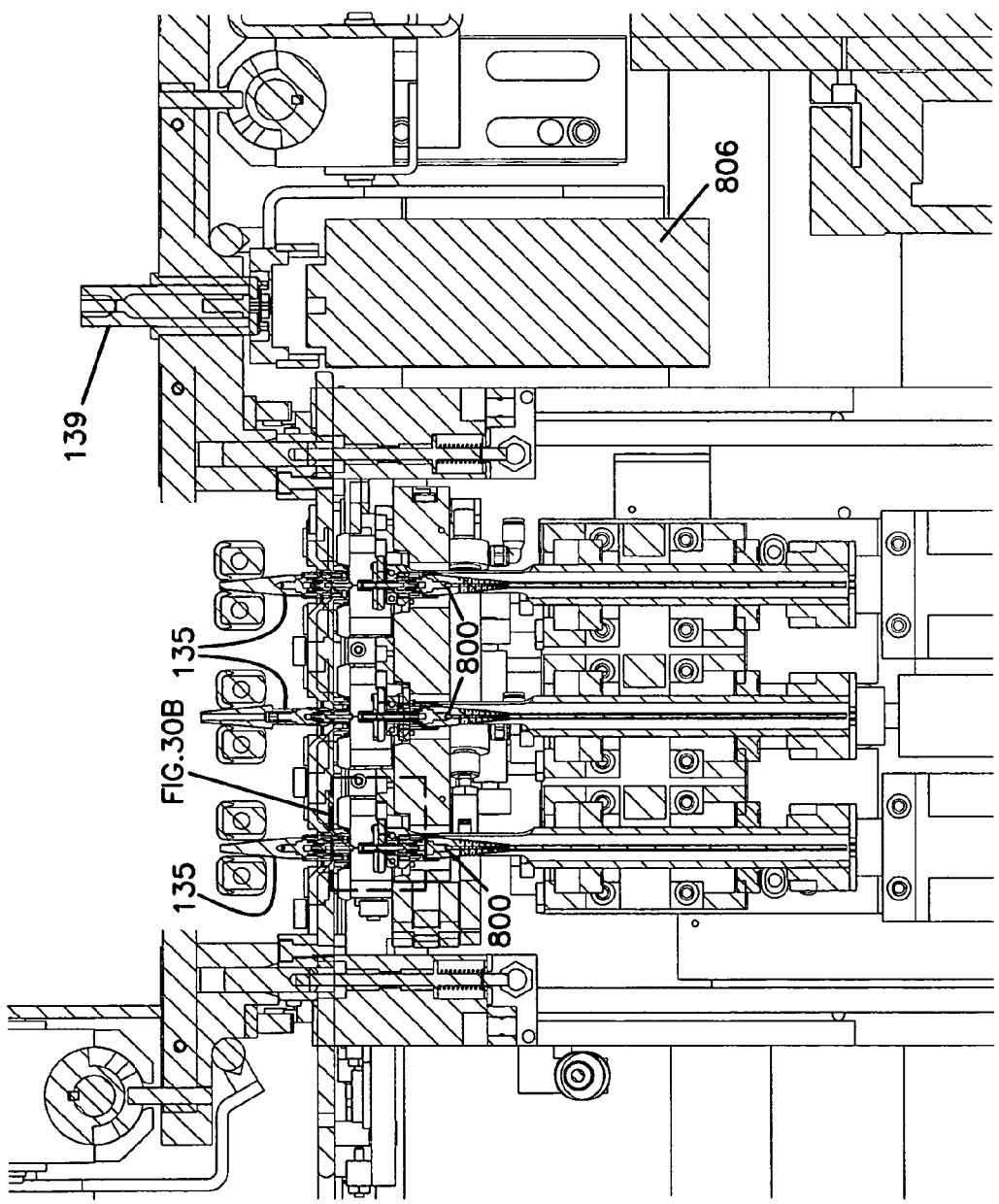

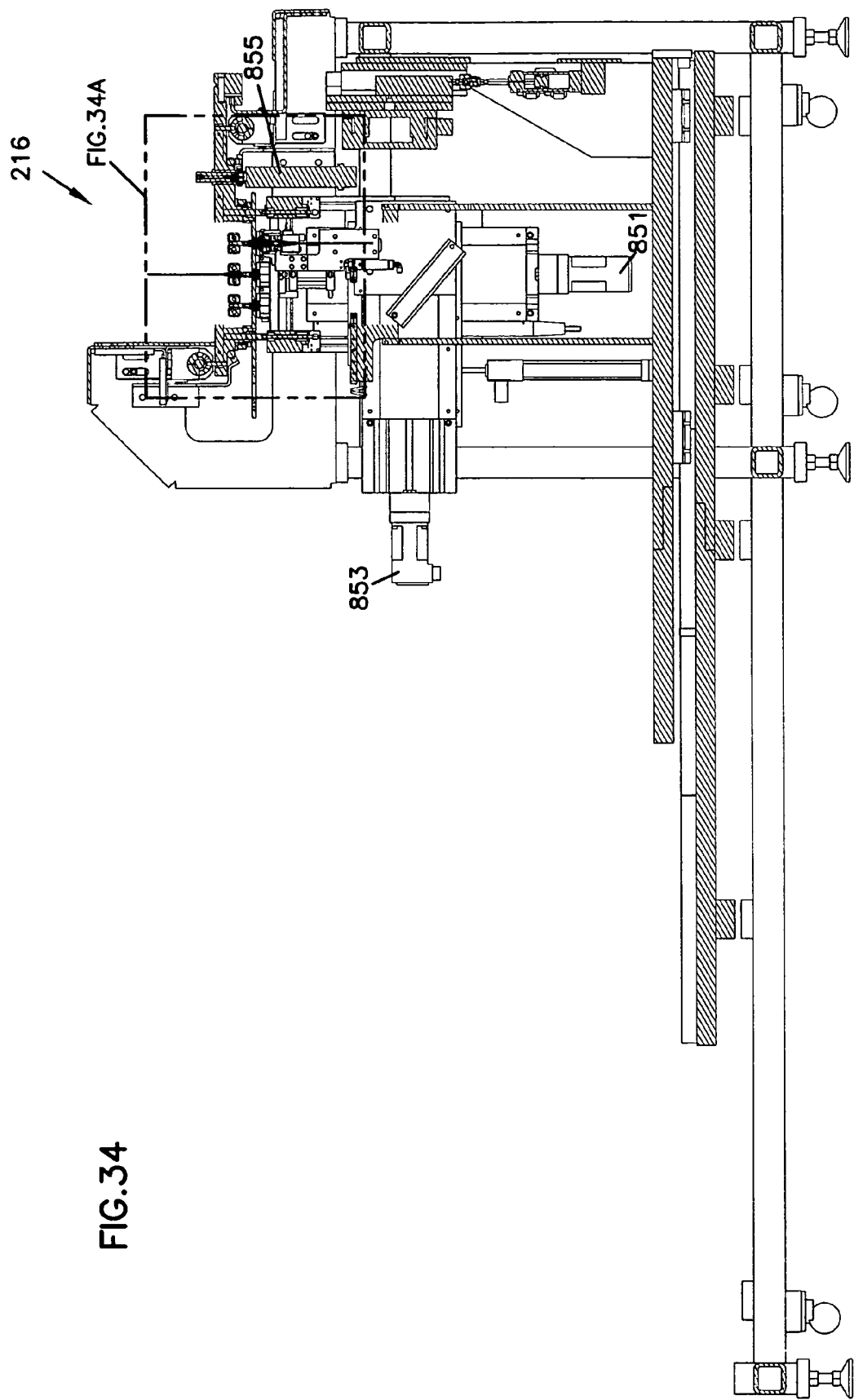

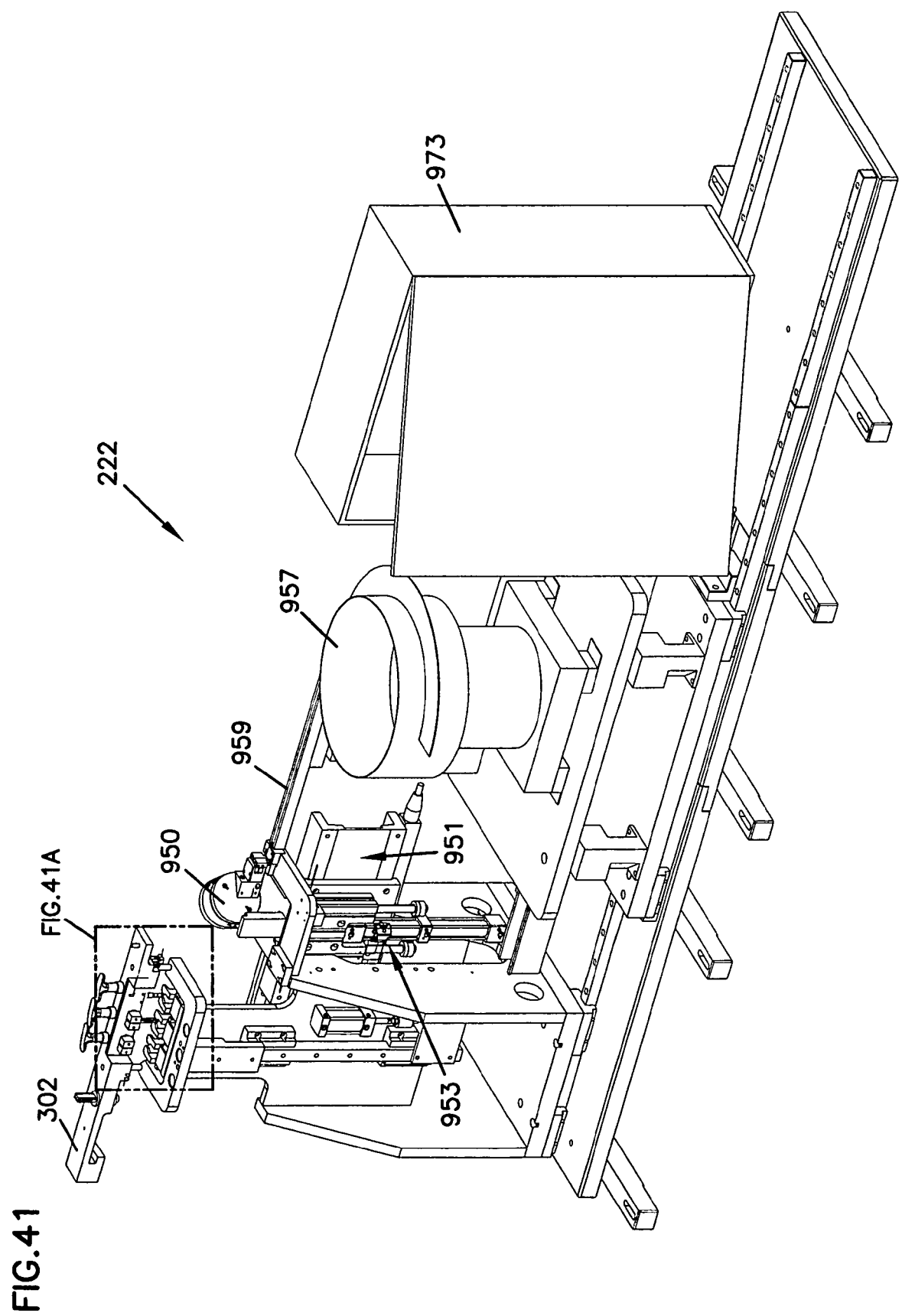

FIXTURE FOR SYSTEM FOR PROCESSING FIBER OPTIC CONNECTORS

RELATED APPLICATION

The present application claims priority to U.S. Patent Provisional Application Ser. No. 60/579,755, entitled "System and Method for Processing Fiber Optic Connectors" and filed on Jun. 14, 2004, the entirety of which is hereby incorporated by reference.

TECHNICAL FIELD

The present disclosure relates generally to systems and methods for processing fiber optic connectors.

BACKGROUND

Fiber optic cables are used in the telecommunication industry to transmit light signals in high-speed data and communication systems. A standard fiber optic cable includes a fiber with an inner light-transmitting optical core. Surrounding the fiber typically is a reinforcing layer and an outer protective casing. A fiber terminates at a fiber optic connector. Connectors are frequently used to non-permanently connect and disconnect optical elements in a fiber optic transmission system. Connectors are typically coupled together through the use of an adaptor. An example adapter is shown in U.S. Pat. No. 5,317,663, the disclosure of which is incorporated by reference.

There are many different fiber optic connector types. Some of the more common connectors are FC and SC connectors. Other types of connectors include ST and D4-type connectors.

FIG. 1 shows an example SC connector 10 that includes a ferrule 12. The ferrule 12 is a relatively long, thin cylinder preferably made of a material such as ceramic. Other materials such as metal or plastic can also be used to make the ferrule 12. The ferrule 12 defines a central opening 14 sized to receive a fiber of a given cladding diameter. An epoxy is typically placed into the opening 14 prior to inserting the fiber to hold the fiber in place. The ferrule 12 functions to align and center the fiber, as well as to protect it from damage.

Referring still to FIG. 1, the ferrule 12 is positioned within a ferrule housing 18 typically made of a material such as metal or plastic. An outer grip 19 is mounted over the ferrule housing 18. The housing 18 is externally keyed to receive the grip 19 at a single rotational orientation. A hub assembly 20 spring biases the ferrule 12 toward the front of the connector 10. A crimp sleeve 37 and boot 28 are located at the rear of the connector 10.

As described at U.S. Pat. No. 6,428,215, which is hereby incorporated by reference in its entirety, the connector 10 can be "tuned" by rotating the ferrule 12 relative to the ferrule housing 18 until an optimum rotational position is determined, and then setting the ferrule at the "tuned" or optimum rotational orientation. Connectors are tuned to ensure that when two connectors are coupled together via an adapter, the ends of the fibers being connected are centered (i.e., aligned) relative to one another. Poor alignment between fibers can result in high insertion and return losses. Insertion loss is the measurement of the amount of power that is transferred through a coupling from an input fiber to an output fiber. Return loss is the measurement of the amount of power that is reflected back into the input fiber.

FIG. 2 shows an example FC connector 30 having a ferrule 32 mounted within a ferrule housing 34. A key 36 is fitted over the ferrule housing 34. The key 36 is positioned to correspond to a tuned orientation of the ferrule 32. An outer grip or connector 38 mounts over the ferrule housing 34. A hub assembly 40 is fixedly mounted to the ferrule 32. The hub assembly 40 spring biases the ferrule in a forward direction. The connector 30 also includes a dust cap 42 that covers the front of the ferrule 32, and a crimp sleeve 37 and boot 44 mounted at the rear of the connector 30.

In addition to tuning, insertion and return loss can be improved by polishing the end faces of the ferrules. During the polishing process, the ferrules are commonly held in a fixture, and the end faces are pressed against a rotating polishing wheel or disk. Frequently, the end faces are polished to form a polished surface oriented along a plane that is perpendicular with respect to the longitudinal axis of the fibers. However, for some applications, the end faces are polished to form a surface aligned at an oblique angle with respect to the longitudinal axis of the fibers.

Other process steps are also undertaken to complete the manufacture of fiber optic connectors. For example, after polishing, the end faces of the connector ferrules are often cleaned. Other steps include tuning the connectors, testing the connectors for insertion and return loss, and assembling the various components of the connectors.

Historically, the manufacture of fiber optic connectors has been quite labor intensive. Originally, connectors were individually manually polished and individually manually moved through the various processing steps. Manufacturing efficiency improved with the more prevalent use of multi-connector fixtures (e.g., see U.S. Pat. No. 6,396,996), which allowed multiple connectors to be simultaneously processed. While multi-connector fixtures have improved manufacturing efficiencies, further improvements in the area of automation are needed.

SUMMARY

One aspect of the present disclosure relates to equipment having features adapted to facilitate automating various steps in the process of manufacturing a fiber optic connector.

A variety of advantages of the invention will be set forth in part in the description that follows, and in part will be apparent from the description, or may be learned by practicing the invention. It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of the specification, illustrate several aspects of the invention and, together with the description, serve to explain the principles of the invention. A brief description of the drawings is as follows:

FIG. 4E is a schematic diagram of an example SC connector adjust station of the system of FIG. 4;

FIG. 4F is a schematic diagram of an example FC connector key press station of the system of FIG. 4;

FIG. 4G is a schematic diagram of an example dust cap station of the system of FIG. 4;

FIG. 5 is a perspective view of an example fixture;

FIG. 6 is a top view of the fixture of FIG. 5;

FIG. 7 is a side view of the fixture of FIG. 5;

FIG. 7A is another side view of the fixture of FIG. 7 with one control knob in a released position;

FIG. 8 is an end view of the fixture of FIG. 5;

FIG. 9 is an opposite end view of the fixture of FIG. 5;

FIG. 10 is a cross-sectional view taken along line 10—10 of the fixture of FIG. 6;

FIG. 10A is a cross-sectional view taken along line 10A—10A of the fixture of FIG. 6 with one control knob in the released position;

FIG. 11 is a perspective view of an example stranded bare fiber support sleeve;

FIG. 12 is an exploded perspective view of the support sleeve of FIG. 11;

FIG. 13 is a perspective view of an example cart;

FIG. 14 is a side view of the cart of FIG. 13;

FIG. 15 is a front view of the cart of FIG. 13;

FIG. 16 is a top view of the cart of FIG. 13;

FIG. 28 is another cross-sectional view of a portion of the cleaning station of FIG. 25;

FIG. 29 is a side view of an example tuning station;

FIG. 30 is a cross-sectional view of the tuning station of FIG. 29;

FIG. 30A is an enlarged view of a portion of the tuning station of FIG. 30;

FIG. 34 is a cross-sectional view of the testing station of FIG. 33;

FIG. 39A is an enlarged perspective view of a portion of the FC connector key press station of FIG. 39;

FIG. 41 is another schematic view of the dust cap station of FIG. 40 with portions of the station removed;

Figures 1, 2:
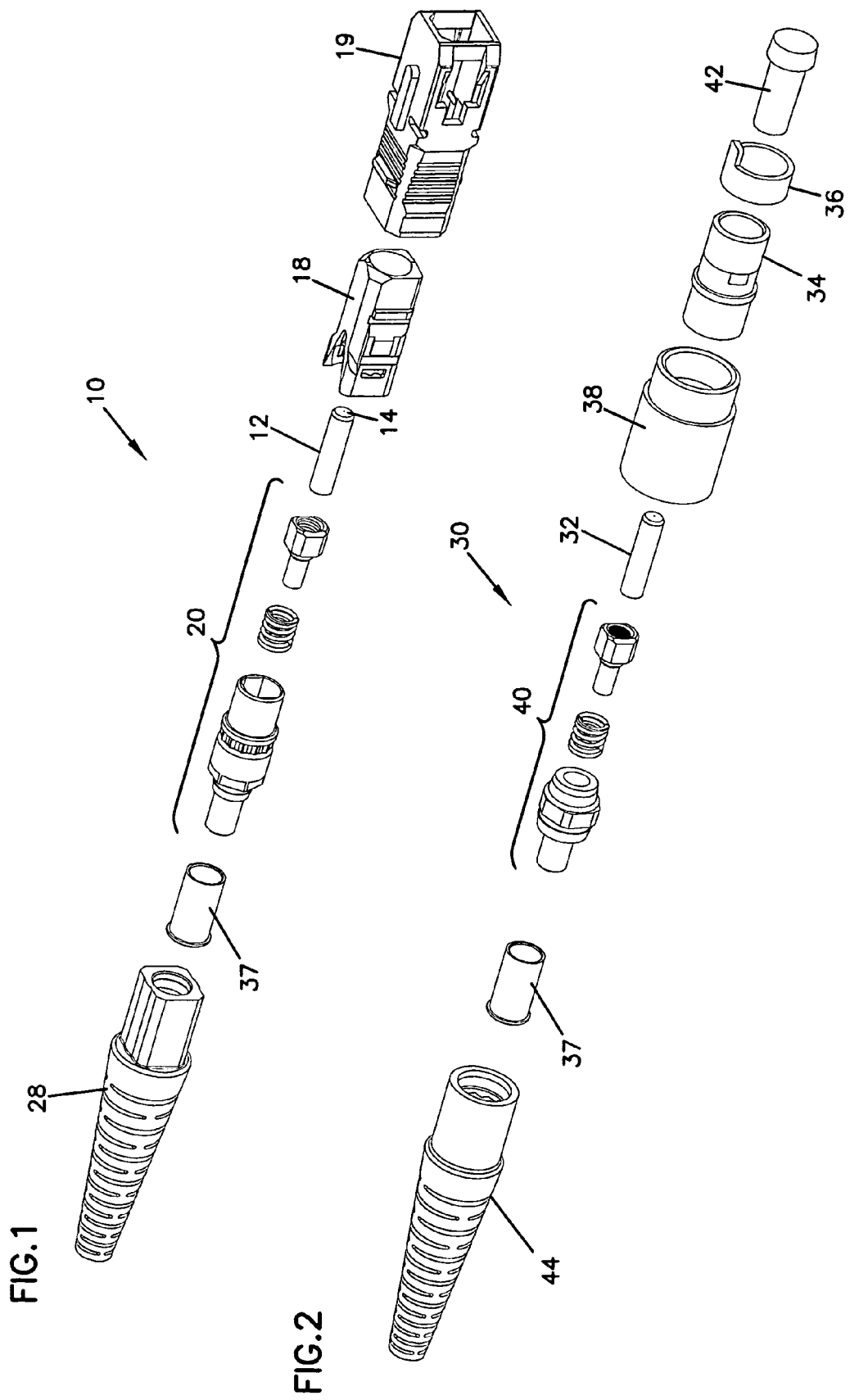
FIG. 1 illustrates a typical prior art SC connector.
FIG. 2 illustrates another typical prior art FC connector.

While the invention is amenable to various modifications and alternative forms, the specifics there have been shown by way of example in the drawings and will be described in detail below. It is to be understood, however, that the intention is not to limit the invention to a particular embodiment. On the contrary, the intention is to cover all modifications, equivalents and alternatives falling within the scope of the invention as defined by the appended claims.

DETAILED DESCRIPTION

In the following detailed description, references are made to the accompanying drawings that depict various embodiments in which the invention may be practiced. It is to be understood that other embodiments may be utilized, and that structural and functional changes may be made without departing from the scope of the present invention.

I. First Embodiment of Automated Connectorization System

A. System Description

Figure 3:
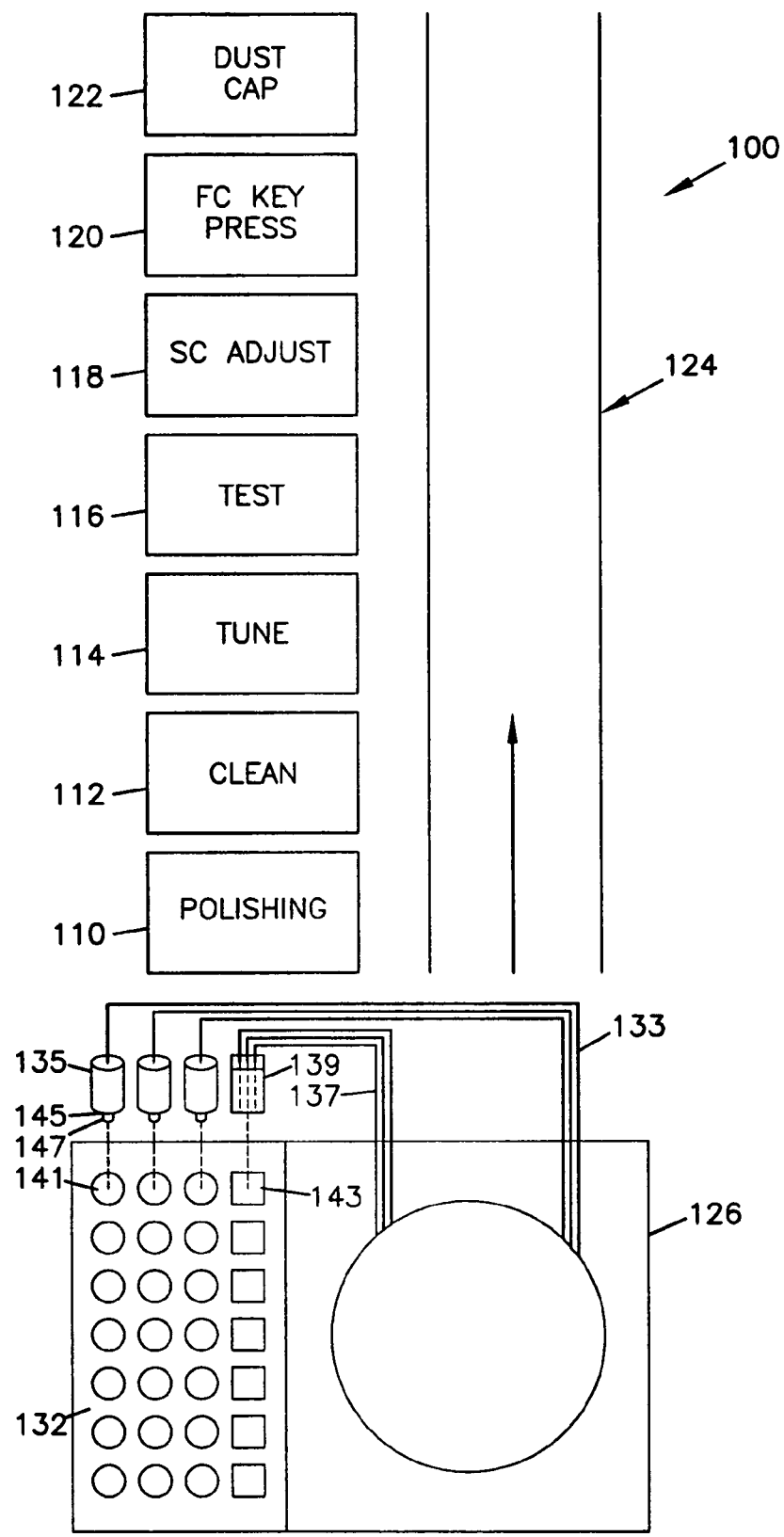
FIG. 3 is a schematic diagram of an example embodiment of a connector processing system having features that are examples of inventive aspects in accordance with the principles of the present disclosure.

FIG. 3 schematically depicts a fiber optic connector processing system 100 having features that are examples of inventive aspects in accordance with the principles of the present disclosure. The system 100 is adapted for use in processing connectorized fiber optic cables 133 (e.g., ribbon or stranded cable). The connectorized cables 133 typically include fiber optic connectors 135 (e.g., SC connectors, FC connectors, ST connectors, or D4) terminated at first ends of the cables 133, and bare fibers 137 (e.g., fibers that have been stripped and cleaved) located at second ends of the cables 133. The bare fibers 137 can be housed within bare fiber support sleeves 139 that protect and prevent bending of the bare fibers, and also facilitate optically coupling the bare fibers 137 to test equipment during processing of the cables 133. After processing of the cables 133, the bare fibers 137 can be used to provide field terminations or to provide splices with other cables.

Referring still to FIG. 3, the system 100 includes a plurality of modular processing stations arranged in an assembly line configuration. The processing stations shown include a polishing station 110, a cleaning station 112, a tuning station 114, a test station 116, an SC connector adjust station 118, an FC connector key press station 120, and a dust cap installation station 122. The system 100 also includes a conveying system 124 for conveying the connectorized optical cables 133 through the various processing stations. One or more processing units (e.g., personal computers or other controllers) can be used to control the conveying system 124 and also to control the processes at each of the process stations.

The conveying system 124 includes a carrier 126 adapted for carrying any number of optical cables 133 ranging from a single optical cable up to hundreds of optical cables. The carrier 126 is shown carrying fixtures 132 for securing the connectors 135. The fixtures 132 include clamps 141 for holding the connectors 135 as the connectors are processed at the various processing stations. The clamps 141 preferably hold the connectors 135 with ferrules 145 of the connectors exposed so that end faces 147 of the ferrules 145 can be readily accessed for processing. The fixtures 132 also include receiver sockets 143 for receiving the bare fiber support sleeves 139. When mounted within the receiver sockets 143, the ends of the bare fiber support sleeves 139 are exposed to facilitate optically coupling the bare fibers 137 to test equipment during processing. The fixtures of the carrier 126 are preferably adapted to hold a plurality of connectors 135 during processing. In one non-limiting embodiment, the fixtures of the carrier can have a capacity of at least 72 connectors 135.

The stations are preferably standalone units that are assembled together to form the assembly line. The modularity of the stations allows the stations to be readily removed, added, or rearranged along the assembly line. For example, each station can include wheels to allow for ease in the rearrangement of the different stations. While seven stations have been shown in the embodiment of FIG. 3, it will be appreciated that additional stations can be added, certain stations can be removed, and/or the order of the stations can be changed without departing from the principles of the present disclosure.

B. Description of System Operation

In use, the carrier 126 initially conveys the connectorized optical cables 135 to the polishing station 110. The polishing station 110 preferably includes a plurality of substations each corresponding to a different polishing function. For example, the polishing substations can be configured with polishing mediums (e.g., films, disks, etc.) of different coarseness, and polishing pads of differing durometers, to achieve different polishing functions.

The polishing station 110 can include one or more drive mechanisms for moving the polishing mediums relative to the ferrule end faces 147 of the connectors 135 being processed. For example, the drive mechanisms can spin, oscillate or otherwise move the polishing mediums relative to the ferrule end faces 147. Alternatively, the end faces 147 of the connectors 135 can be moved relative to the polishing mediums. The polishing mediums and/or ferrules 145 of the connectors 135 can be biased to maintain contact between the end faces 147 and the polishing mediums.

After the ferrule end faces 147 of the connectors 135 have been polished, the carrier 126 conveys the connectorized cables 133 to the cleaning station 112. At the cleaning station 112, residue or other foreign material deposited on the ferrules 145 of during the polishing stage is preferably removed. In one embodiment, steam and blasts of air (e.g., carbon dioxide) can be used to clean the ferrules 145.

After cleaning, the carrier 126 conveys the fixtures 132 to the tuning station 114. At the tuning station 114, the connectors 135 (e.g., SC and FC connectors) are tested for insertion and/or return loss at various incremental rotational positions (e.g., 60 degree increments). The connectors 135 are tuned by inputting light into the connectors 135 at each rotational increment, and comparing the relative amount of light that is output from the bare fiber ends 137 at each increment. The rotational orientation of the tuned position (i.e., "the key location") is selected to ensure that when two connectors are optically coupled together, the ferrules of the coupled connectors are relatively oriented to provide optimum optical performance. After tuning, FC connectors can be rotated within the fixtures to place the key locations at known rotational positions that are coordinated with subsequent processing steps (e.g., the key press step at the FC connector key press station 120). Alternatively, in the case of SC connectors, the key locations can be stored in memory for use at the SC connector adjust station 118.

From the tuning station 114, the carrier 126 moves the connectorized cables 133 to the test station 116. At the test station 116, each of the connectors 135 is tested for insertion loss and return loss to ensure each of the connectors complies with predetermined insertion loss and return loss standards. The connectors 135 are tested by inputting light through the connectors 135 and measuring the quantity of light output through the bare fiber ends 137. Information concerning connector failure is stored in memory for use during subsequent processing operations.

If SC connectors are being processed, the carrier 126 moves from the test station 116 to the SC connector adjust station 118. If FC connectors are being processed, the carrier 126 moves from the test station 116, past the SC connector adjust station 118, to the FC connector key press station 120. If ST or D4 connectors are being processed, the carrier moves from the test station 116, past both the SC connector adjust station 118 and the FC connector key press station 120, to the dust cap station 122.

At the SC connector adjust station 118, the ferrule of each SC connector (e.g., hub assembly 20 of SC connector 10 shown in FIG. 1) is rotated relative to its corresponding ferrule housing (e.g., housing 18) until the keys of the ferrule housings align with the key locations previously determined at the tuning station 114 and stored in memory. After the SC connector adjustment process has been completed, the carrier 126 carries the SC connectors past the FC connector key press station 120 to the dust cap station 122.

At the FC connector key press station 120, keys (e.g., key 36 of FC connector 30 shown in FIG. 2) are pressed on to the bodies of FC connectors at the key mounting locations. The pre-orientation of the rotational positions of the FC connectors at the tuning station 114 ensures that the keys are properly oriented at the optimal tuned or key locations. Thereafter, the carrier 126 moves the FC connectors to the dust cap station 122.

At the dust cap station 122, dust caps (e.g., dust cap 42 shown in FIG. 2) are pressed over the ferrules of the connectors. In some embodiments, dust caps are only applied to those connectors that were successfully processed through system 100. For example, dust caps can be placed on only those connectors that receive a passing rating at test station 116. In this manner, during subsequent processing, the presence of a dust cap indicates that the connectors are ready for subsequent processing (e.g., installation of the outer grips). The absence of a dust cap alerts the operator that the connector has failed in some respect, and alerts the operator to remove the connector for re-processing.

II. Second Embodiment of Automated Connectorization System

A. System Description

FIGS. 4 and 4A–4G show an alternative fiber optic connector processing system 200 having features that are examples of inventive aspects in accordance with the principles of the present disclosure. The system 200 includes a plurality of modular processing stations arranged in an assembly line. Similar to the previous embodiment, the processing stations include a polishing station 210, a cleaning station 212, a tuning station 214, a test station 216, an SC connector adjust station 218, an FC connector key press station 220 and a dust cap station 222, all of which are described further below.

The system 200 also includes a cart conveying unit 224 for conveying a cart 226 from station to station. See FIGS. 13–18 and accompanying description below. The cart 226 is adapted for carrying one or more connectorized fiber optic cables 133.

The system 200 further includes fixture assemblies 300 that can be mounted to and detached from the cart 226. See FIGS. 5–10B and accompanying description below. For clarity, only a few of the fixture assemblies 300 are shown mounted to the cart 226. The fixture assemblies 300 each include a tuning and test fixture 302 for clamping boots 149 of the connectors 135, and a polishing fixture 304 having nests for supporting the ferrules 145 of the connectors 135. The tuning and test fixtures 302 also define receptacles 342 for receiving the bare fiber support sleeves 139 mounted to bare fiber ends 137 of the cables 133.

The system 200 further includes a fixture conveyor 240 for conveying the fixture assemblies 300 from station to station along the assembly line. See FIGS. 19–24A and accompanying description below. The fixture conveyor 240 is a separate conveyor from the cart conveyor 224. However, the operation of the fixture conveyor 240 is coordinated with the operation of the cart conveyor 224 such that the fixture assemblies 300 and their corresponding cart 226 move in a side-by-side relationship from station to station.

The system 200 includes a main system controller 250 that coordinates the operation of the fixture conveyor 240 with the operation of the cart conveyor 224. The main system controller 250 interfaces with controllers at each of the stations to integrate each station into the overall system. In certain embodiments, the main systems controller 250 can include a personal computer with keyboard access.

B. System Operation Overview

In general use of the system 200, a spool 260 of fiber optic cable 133 is placed on the cart 226 while the cart is off-line from the cart conveyor 224. Connectors 135 of the fiber optic cables 133 are then clamped within the fixture assemblies 300, and the bare fiber support sleeves 139 are inserted within receptacles 342 defined by the fixture assemblies 300. The fixture assemblies 300 are then secured to the cart 226.

After securing the fixture assemblies 300 to the cart 226, the cart 226 is manually wheeled to the cart conveyor 224. The cart 226 then engages the cart conveyor 224 and is conveyed toward the polishing station 210. Prior to reaching the polishing station 210, the fixture assemblies 300 are disconnected from the cart 226 and engaged with the fixture conveyor 240. The fixture conveyor 240 then conveys the fixture assemblies 300 to the polishing station 210 for polishing of the ferrules 145.

At the end of the polishing station, the polishing fixtures 304 of fixture assemblies 300 are stripped from the tuning and test fixtures 302 to provide more ready access to the connectors 135 during subsequent processing steps. The tuning and test fixtures 302 are then moved by the fixture conveyor 240 to subsequent processing stations to allow the connectors 135 to be processed (e.g., cleaned, tuned, tested, key adjusted, key pressed, fitted with dust caps or processed by other processing operations).

Typically, the tuning and test fixtures 302 are stopped at stations where processing is desired to provide sufficient time for processing. As described with respect to the embodiment of FIG. 3, depending on the type of connector being processed, certain of the stations may be by-passed. The functions performed at each of the stations can be similar to those described with respect to the embodiment of FIG. 3.

Movement of the cart 226 is preferably coordinated with the movement of the fixture on the conveyor 240. The conveyor 240 preferably moves the fixtures in a stepwise motion (i.e., the movement is indexed or stepped in fixed increments). The cart conveyor 224 preferably moves the cart 226 in a stepwise motion that corresponds to the stepwise motion generated by the conveyor 240. In this manner, the fixtures 300 (which carry the connectors 135) and the cart 226 (which carries the bulk of the cable 133) remain in a side-by-side relationship throughout the various processing steps.

After the dust cap station 222, the fixtures 302 are disengaged from the conveyor 240 and re-connected to the cart 226, and the cart 226 is disengaged from the cart conveyor 224 and manually wheeled to a location for further processing of the connectors 135. For example, at a subsequent location, outer grips can be pressed on the connectors 135. Thereafter, the connectors 135 can be removed from the fixtures 302, and the fixture assemblies 300 can be re-assembled and reloaded with a next batch of connectors 135. The cart 226 can then be wheeled back to the start of the cart conveyor 224 to initiate processing of the next batch of connectors 135.

A plurality of carts 226, each including a plurality of connectors 135 mounted in fixture assemblies 300, can be processed by system 200. For example, a plurality of carts 226 can be sequentially loaded into system 200 so that each station of system 200 is eventually occupied at a given point in time.

C. System Component Descriptions a. Fixture Assemblies

Referring now to FIGS. 5–10B, the fixture assemblies 300 of the system 200 each include the tuning and test fixture 302 as well as the polishing fixture 304. The polishing fixture 304 is detachably mounted to the underside of the tuning and test fixture 302. A latching arrangement, such as a pair of spring latches 306, is used to secure the polishing fixture 304 relative to the tuning and test fixture 302. The polishing fixture 304 also includes alignment pins 308 that fit within openings 309 defined by the tuning and test fixture 302 to maintain alignment between the two fixtures 302, 304. See FIGS. 10 and 10A.

Referring to FIGS. 8 and 9, each of the spring latches 306 includes a pair of resilient arms 310 secured to the polishing fixture 304. The resilient arms 310 are biased together and interlocked with a retaining member 312 provided on the tuning and test fixture 302. The polishing fixture 304 can be detached from the tuning and test fixture 302 by pulling downwardly on the polishing fixture 304 with sufficient force to flex the arms 310 of the latches 306 apart such that the arms 310 disengage from the retaining member 312.

The polishing fixture 304 of the fixture assembly 300 includes three ferrule nests 314 sized to receive ferrules 145 of the connectors 135. See FIGS. 10, 10A, and 10B. The ferrules 145 protrude downwardly beyond the nests 314 such that the end faces 147 of the ferrules 145 are exposed for polishing. In addition, the ferrule nests 314 form a close tolerance fit as the ends 147 of ferrules 145 extend below the fixture 304.

Figure 10B:
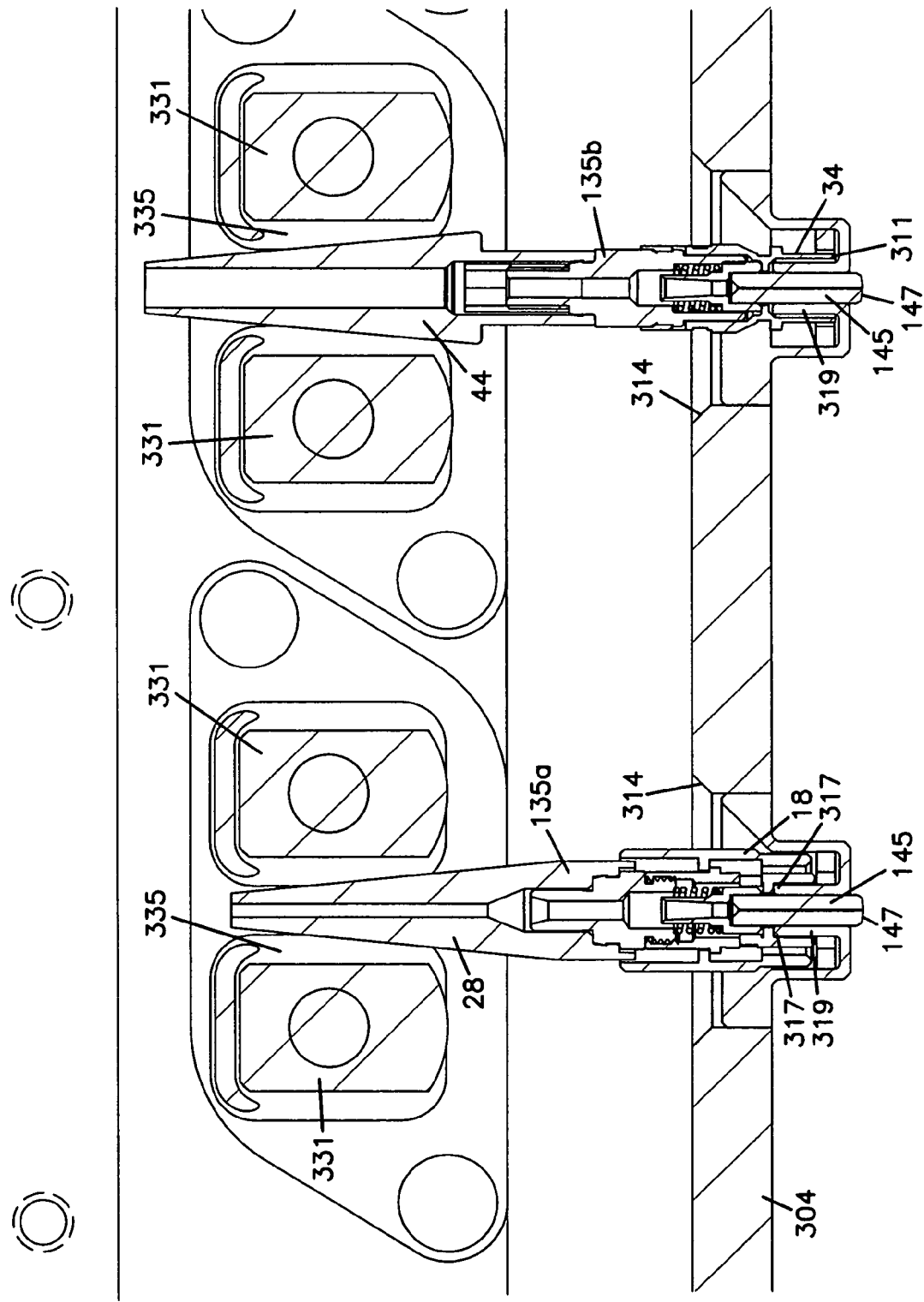
FIG. 10B is an enlarged view of a portion of the fixture of FIG. 10A.
Figure 17:
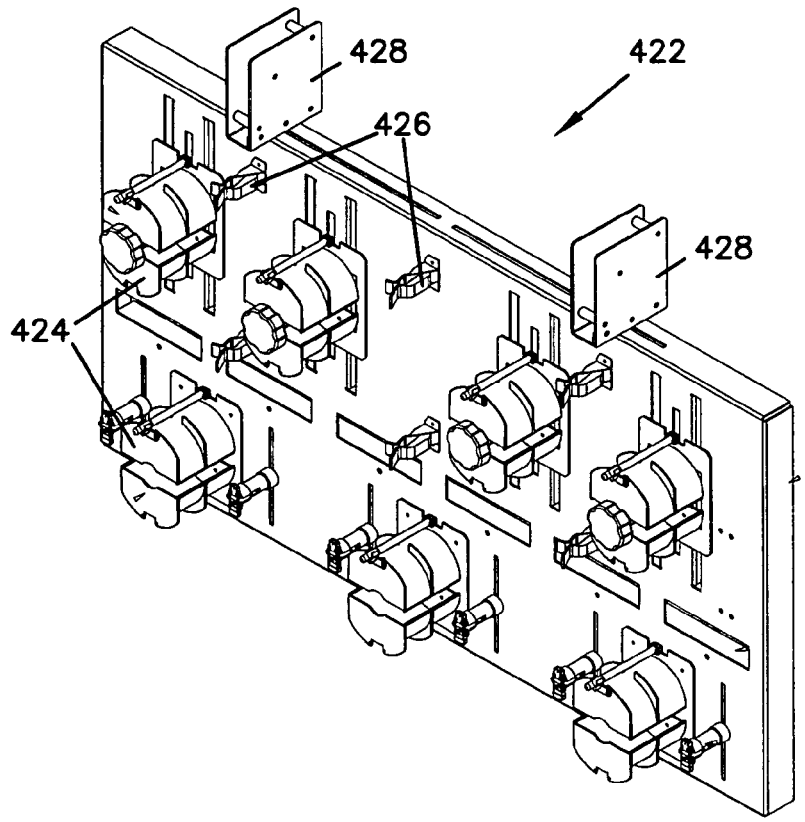
FIG. 17 is a perspective view of the front panel of the cart of FIG. 13.
Figure 18:
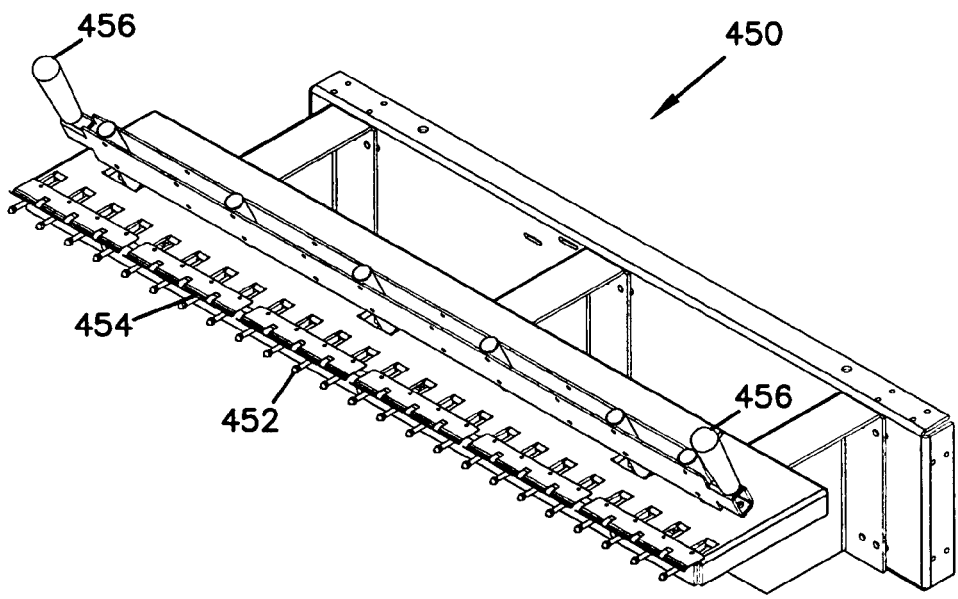
FIG. 18 is a perspective view of the fixture mount of the cart of FIG. 13.

Each ferrule nest 314 also includes a boss 319 with end 317. See FIG. 10B. The boss 319 functions to center the ferrule 145 of each connector 135 and is sized so that the end 147 of the ferrule 145 for both FC connectors and SC connectors extends an equal distance below the fixture 304. Specifically, as shown in FIG. 10B, ends 317 of boss 319 extend into and contact housing 18 of SC connector 135a. In contrast, an end 311 of housing 34 of FC connector 135b contacts the base of the nest 314. In this manner, end faces 147 of both the SC connector 135a and FC connector 135b extend an equal distance below fixture 304.

Figure 4:
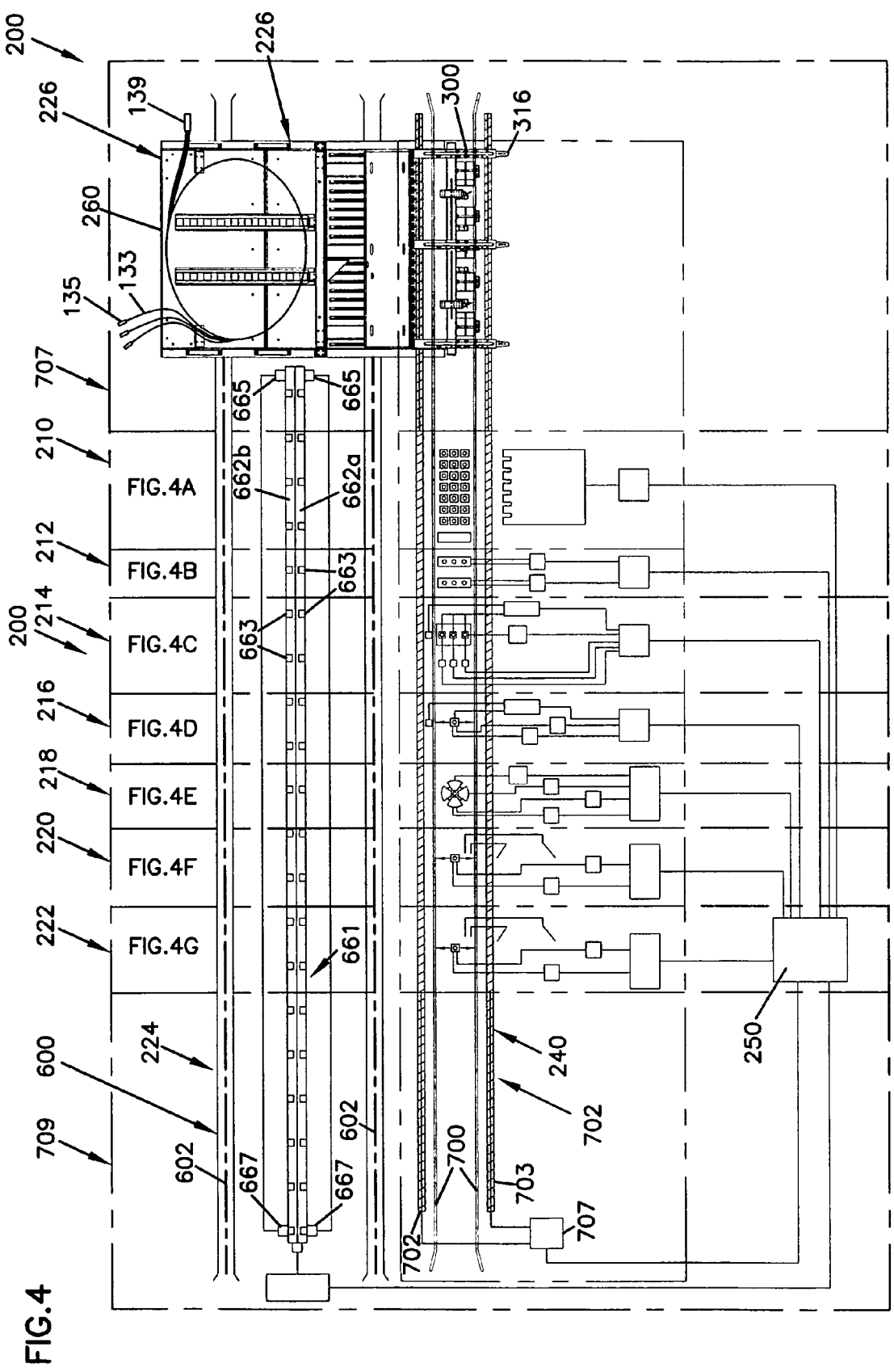
FIG. 4 is a schematic diagram of another example embodiment of a connector processing system having features that are examples of inventive aspects in accordance with the principles of the present disclosure.

As shown in FIGS. 4, 6, and 10, the polishing fixture 304 also includes an extension 316 that extends beyond the end of the tuning and test fixture 302. The extension 316 provides a location where the polishing fixture 304 can be clamped by a polishing machine at the polishing station 212.

Referring to FIG. 8, the tuning and test fixture 302 includes an end opening 315 for receiving retractable retention pins of the cart 226 (see FIG. 18) to mount the fixture assembly to the cart 226. The tuning and test fixture 302 also includes a V-notch 320 (see FIGS. 6 and 7) for interlocking with resilient retention clips provided on the cart 226. The clips interlock with the V-notches 320 to prevent the fixture assemblies 300 from inadvertently rotating on or disengaging from the mounting pins of the cart 226.

The tuning and test fixture 302 also include three clamps 230 (best shown in FIGS. 5, 7, 10, 10A, and 10B) adapted for clamping boots 149 of the connectors 135 to hold the connectors 135 during processing. Each of the clamps 330 includes two clamp members 331 between which the boots 149 of the connectors 135 are clamped. Each of the clamp members 331 includes a recessed mid-region 333. The recessed mid-region 330 defines receptacles (e.g., channels or slots) in which the boots 149 of the connectors 135 can be clamped. The recessed mid-regions 333 have generally V-shaped cross-sections with the widths of the recessed mid-regions 333 enlarging as the recessed mid-regions 333 extend in a downward direction. A pair of resilient members 335 (e.g., O-rings) is mounted within each mid-region 333. The resilient members 335 facilitate gripping the boots 149 of the connectors 135.

The clamp members 331 are spring biased toward one another (i.e., toward a clamped orientation). The clamp members 331 can pivot slightly to accommodate connectors with boots of differing dimensions and tapers. See, for example, FIG. 10B, which illustrates clamp members 331 clamped to boot 28 of SC connector 135a and boot 44 of FC connector 135b. In addition, when the clamp members 331 are moved from the closed to the open position, the clamp members 331 move slightly in an upward direction during the beginning of movement to the open position so that tension on the connector 135 is released prior to release of the boot of the connector.

The tuning and test fixture 302 further includes clamp control knobs 355 for manually opening and closing the clamps 230. In manual operation, as illustrated in FIGS. 7A and 10A, control knob 355a is pulled away from fixture 302 to open the clamp 230a to allow a connector 135 to be inserted into or removed from clamp 230a. Knob 355a can be rotated a quarter turn to temporarily lock clamp 230a in the open position. In an automatic operation, internal components of fixture 302 can be actuated to open clamps 230a, 230b, and 230c without requiring control knobs 355a, 355b, and 355c to be manually pulled upward.

The tuning and test fixture 302 further includes a receiver 340 defining the receptacle 342 for receiving one of the bare fiber support sleeves 139, which is illustrated in FIGS. 11 and 12 and described further below. The receiver 340 extends through the main body of the tuning and test fixture 302 and includes a lower portion that is accessible from the underside of the main body 302. See FIG. 10A. When the bare fiber support sleeve 139 is mounted within the receiver 340, the ends of the bare fibers are accessible from the underside of the tuning and test fixture 302 for allowing the fibers to be optically connected to a test structure such as a remote test head for use in insertion loss and return loss testing.

The tuning and test fixture 302 further includes upper and lower pins 344 and 346. See FIGS. 7 and 10. The upper pin 344 projects upwardly from the main body of the fixture 302, and the lower pin 346 projects downwardly from the main body of the fixture 302. The pins 344, 346 are adapted to engage the fixture conveyor 240. See FIG. 22.

As shown in FIGS. 11 and 12, the bare fiber support sleeves 139 include a top portion 151 that is pivotally mounted to a base portion 152. A fiber holder 156 including ferrules 153 is configured to receive and hold stranded bare fiber. In use, bare stranded fiber is extended through channel 154 formed in base portion 152 and into fiber holder 156. Previously stripped ends of the stranded fiber are positioned to extend through ferrules 153. Then, the top portion 151 is pivoted toward the base portion 152 until in the position illustrated in FIG. 11. Next, the stripped ends of the fibers that extend from ferrules 153 are cleaved. In one embodiment, a cleaver having product no. CT-107, manufactured by Fujikura Ltd. of Tokyo, Japan, is used to cleave the striped fiber. Once the fibers are cleaved, the bare fiber support sleeve 139 is positioned in the tuning and test fixture 302, as shown in FIGS. 5, 7, and 10A. In this position, the ferrules 153 of support sleeve 139 are accessible below the fixture 302.

If, instead of stranded fiber, ribbon fiber is being processed, a similar support sleeve can be used. However, for ribbon fiber, no ferrules are required because the ribbon structure provides adequate support for the fibers. In addition, for ribbon fiber, the fiber can be both stripped and cleaved once the fiber has been placed in the support sleeve.

b. Cart Assembly

FIGS. 13–18 show various views of the cart 226. The cart 226 includes a base 400. A rear portion of the base 400 defines a platform 402 for supporting a spool of fiber optic cable. Rollers 403 are provided on the platform 402 for facilitating loading and unloading spools of fiber optic cable to or from the platform 402. The sides of the platform 402 are enclosed by side walls 404 and the front of the platform 402 is enclosed by a front wall 406. The back of the platform 402 is open to facilitate loading fiber optic spools onto the platform. Handles 408 are provided at the top sides of the side walls 404 for facilitating maneuvering of the cart 226.

With respect to the spools carried by the cart 226, the spools typically range in diameter from 12 inches 36 inches. The spools can carry anywhere from one fiber optic cable to hundreds of fiber optic cables. In the case where a large number of fiber optic cables are wrapped about the spool, the fibers are typically bundled within one or more bundling sheathes. Sub-bundles can be provided within the main sheathed bundles. The fiber optic cables can range in length from a few feet to hundreds of feet. While the cables will typically be provided on spools, it will be appreciated that for short length cables, spools may not be needed.

Referring to FIGS. 13–16, casters 410 are mounted to the underside of the base 400. The casters 410 include pivoting caster wheels 412. The caster wheels 412 include central grooves 414. See FIG. 14. A pair of racks or ladders 416 is also mounted to the underside of the base 400. The ladders 416 provide structure for allowing the cart conveyor 224 to engage the cart 226.

The cart 226 further includes a front cable management structure 420 that projects forwardly from the front wall 406. The cable management structure 420 includes an upright front panel 422. See FIGS. 13, 15, and 17. Cable management structures such as spools 424 for managing excess cable and clamps 426 for clamping cables are mounted to the front panel 422. Two cable clamps 428 are mounted to the top of the upright panel 422. The clamps 428 are adapted for clamping a sheathed portion of a bundle of fiber optic cables. The sheathed portion of the bundles is preferably clamped at the clamps 428, and extensions of the fiber optic cables bundled within the sheath are typically fanned downwardly from the clamps 428 with connectorized ends 135 of the fiber optic cables being clamped within the fixture assemblies 300. Excess length of cable corresponding to the connectors being processed, as well as extra cables having connectors that have already been processed or are soon to be processed, can be managed by wrapping such cables around the spools 424.

The cart 226 further includes a fixture mount 450. See FIGS. 14 and 18. The fixture mount 450 includes a plurality of mounting pins 452 adapted to be received within the rear openings 315 of the tuning and testing fixtures 302. The depicted mount 450 is adapted for mounting 24 fixture assemblies 300. However, it will be appreciated that the capacity of the mount 450 can be varied without departing from the principles of the disclosure.

The fixture mount 450 also includes resilient retention clips 454 that engage the notches 320 in the tuning and test fixtures 302 to prevent the fixtures 302 from inadvertently disengaging from the pins 452. The fixture mount 450 further includes a handle 456 for retracting the fixture mount 450 to disengage the fixture assemblies 300 from the cart 226 after the fixture assemblies 300 have been engaged by the fixture conveyor 240. By pivoting the handle 456, the pins 452 are withdrawn from the rear openings 315 of the tuning and test fixtures 302 to disengage the fixture assemblies 300 from the cart 226. As the fixture mount 450 is retracted, the retaining clips 454 flex upwardly to allow the fixture assemblies 300 to be disengaged from the cart 326.

The cart 226 further includes a bin 460 for receiving and storing the polishing fixtures 304. See FIG. 14. As will be described below, after the polishing processes have been completed at the polishing station 212, the polishing fixtures 304 are stripped from the tuning and test fixtures 302. After the polishing fixtures 304 have been stripped, the polishing fixtures 304 slide by gravity down a ramp and into the bin 460 for storage. Subsequently, the polishing fixtures 304 are removed from the bin 460 and recoupled to fixtures 302 for processing the next batch of connectors.

c. Cart Conveyor

The cart conveyor 224 is depicted in FIG. 4 as including a pair of parallel tracks 600 for receiving the caster wheels 412 of the cart 226. Center guides 602 are located within each of the tracks 600. When the cart 226 is conveyed along the tracks 600, the grooves 414 of the wheels 412 ride along the center guides 602. The cart conveyor 224 also includes a drive mechanism for moving the cart 226 along the tracks 600. It will be appreciated that the drive mechanism can have any number of different configurations. In the depicted embodiment, the drive mechanism includes a pneumatically powered walking beam drive 661. In other embodiments, the drive mechanism can include a chain drive, a stepper motor drive, a rack and pinion drive, or any other drive suitable for conveying the cart in a controller manner.

The walking beam drive 661 includes a pair of parallel beams 662a, 662b having lugs 663 for engaging the ladders 416 on the underside of the cart 226. Vertical pneumatic cylinders 665 raise and lower the beams 662a, 662b and horizontal pneumatic cylinders 667 move the rails horizontally. The left beam 662a is preferably moved in a square pattern. For example, beam 662a is raised (e.g., by cylinders 665) such that the lugs 663 engage the left ladder 416 of the cart 226, is moved horizontally forward (e.g., by cylinder 667) to move the cart 226 forward one increment, is lowered (e.g., by cylinders 665) to disengage the lugs 663 from the cart 336, and is then horizontally returned to its initial position (e.g., by cylinder 667) where it is ready to repeat the cycle. The right beam 662b can be moved in a similar pattern.

Alternatively, the beam 662b can simply be raised and lowered to selectively engage right ladder 416 the cart 226. For example, the right beam 662b can be raised when the left beam 662a is lowered to prevent unintentional movement of the cart 226, and then lowered when the lugs 663 of the left beam 662a are in engagement with the cart 226.

d. Fixture Conveyor

Referring now to FIGS. 4 and 19–24A, the fixture conveyor 240 is shown including two generally parallel guide rails 700 and two generally parallel screw drives 702. The screw drives 702 can be powered by a drive mechanism 707 (see FIG. 21) such as a pneumatic drive, a servo-motor drive, or any other drive suitable for rotating the screw drives 702. The screw drives 702 are vertically offset from one another (i.e., set at different elevations) such that one of the screw drives 702 is adapted to engage the upper guide pins 344 of the fixtures 302, and the other of the screw drives 702 is adapted to engage the lower pins 346 of the fixtures 302. See FIGS. 20, 21, and 22.

Figure 22:
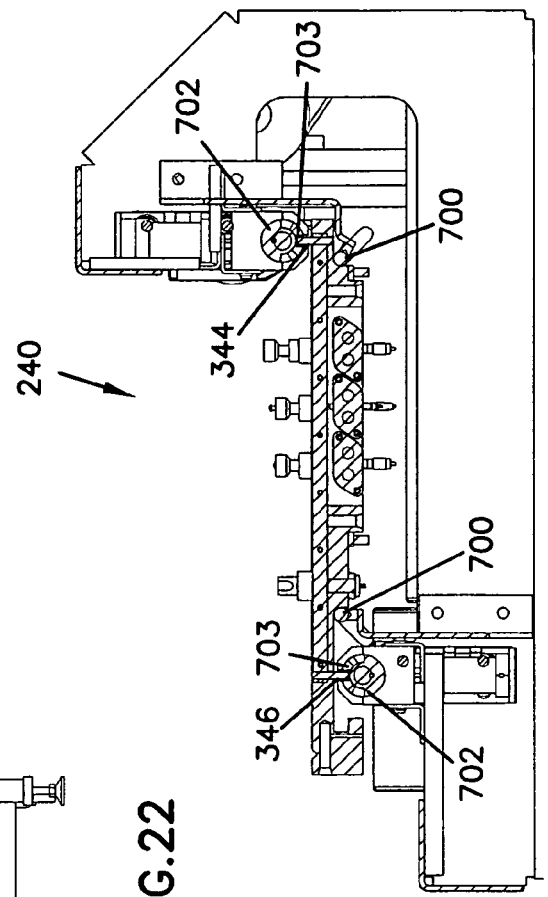
FIG. 22 is a cross-sectional view of a portion of a fixture conveyor.

As shown in FIG. 22, the pins 344, 346 ride within slots 703 defined within the screw drives 702. By rotating the screw drives 702, the fixture 300, including the tuning and test fixture 302 and polishing fixture 304, is conveyed along the screw drives 702.

Figure 23A:
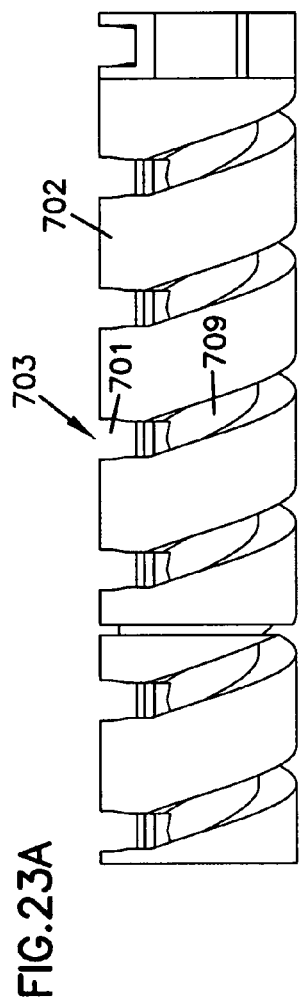
FIG. 23A is an enlarged view of a portion of the conveyor of FIG. 23.
Figure 23B:
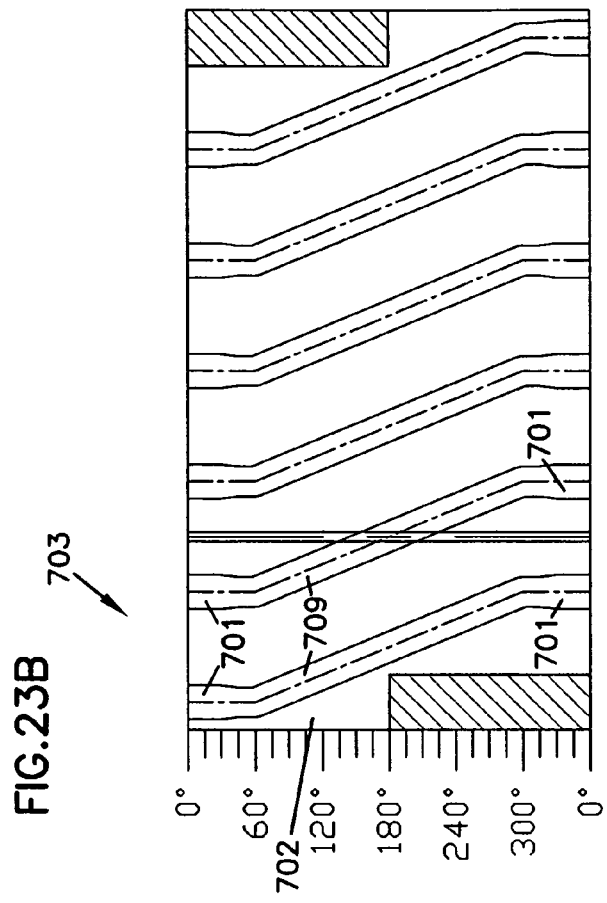
FIG. 23B is an unwrapped view of the portion of the conveyor of FIG. 23A.

The slots 703 of the screw drives 702 are generally arranged at an angled pitch configuration 709 for ⅔ of a turn and then a non-angled configuration 701 for the remaining ⅓ of the turn. See FIGS. 23A and 23B. This configuration results in the fixture assemblies 300 being conveyed along the screw drives 702 for ⅔ of the turn (i.e., in angled pitch 709) and then dwelling at one spot for ⅓ of the turn (i.e., in non-angled configuration 701) for each revolution of the screw drives 702. The dwell times provided by the non-angled portions 701 of the slots 703 assist in preventing inertial bumping of the fixtures during conveying, as well as allow the screw drives 702 to reengage the fixture 300 after each polishing cycle, as described further below.

In one embodiment, the fixtures 300 are moved about 1 inch per revolution of the screw drives 702 and are typically moved in 2 inch increments between processing steps. To correspond with the fixture conveyor 240, the cart conveyor 224 preferably moves the cart 226 in the same 2 inch increments. While 2 inch increments are preferred, it will be appreciated that the size of the increments can be varied without departing from the principles of the disclosure.

Figure 23:
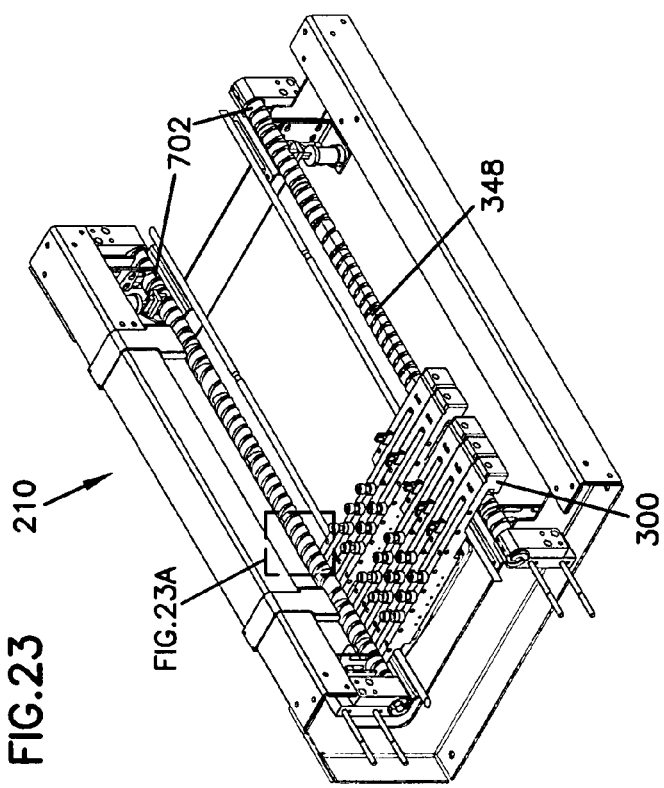
FIG. 23 is a perspective view of the fixture conveyor at the polishing station.
Figure 24:
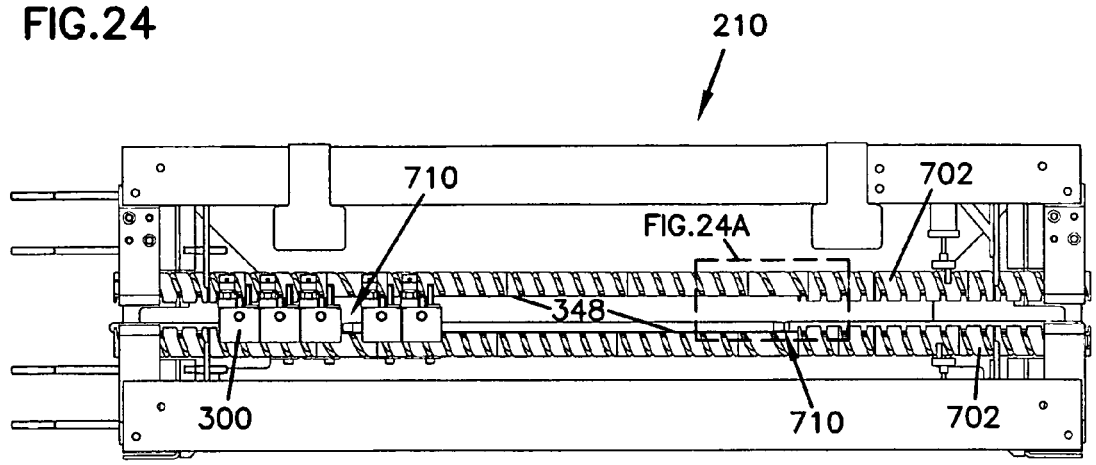
FIG. 24 is a front view of the conveyor of FIG. 23.
Figure 24A:
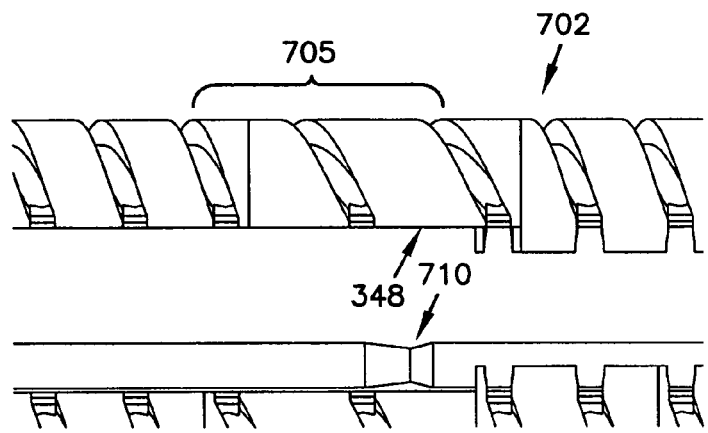
FIG. 24A is an enlarged view of a portion of the conveyor of FIG. 24.
Figure 25:
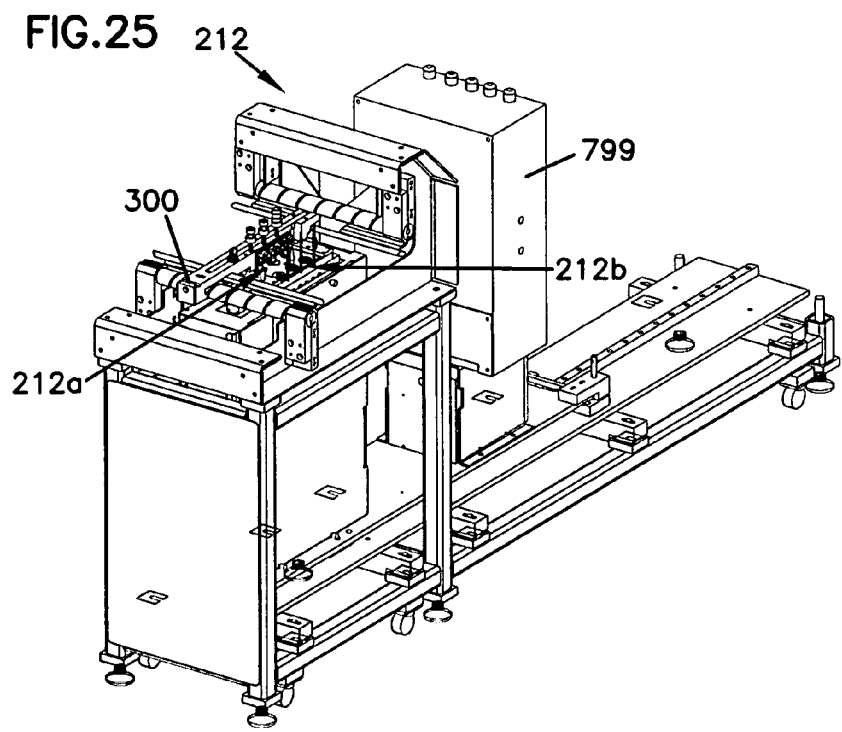
FIG. 25 is a perspective view of an example cleaning station.
Figure 26:
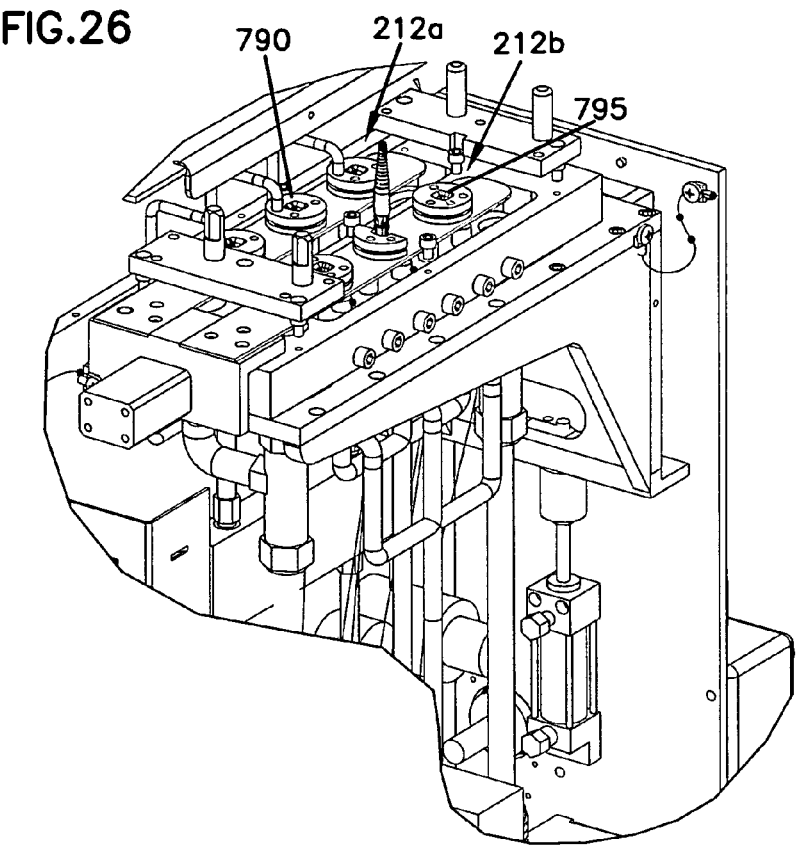
FIG. 26 is a perspective view of a portion of the cleaning station of FIG. 25.
Figure 27:
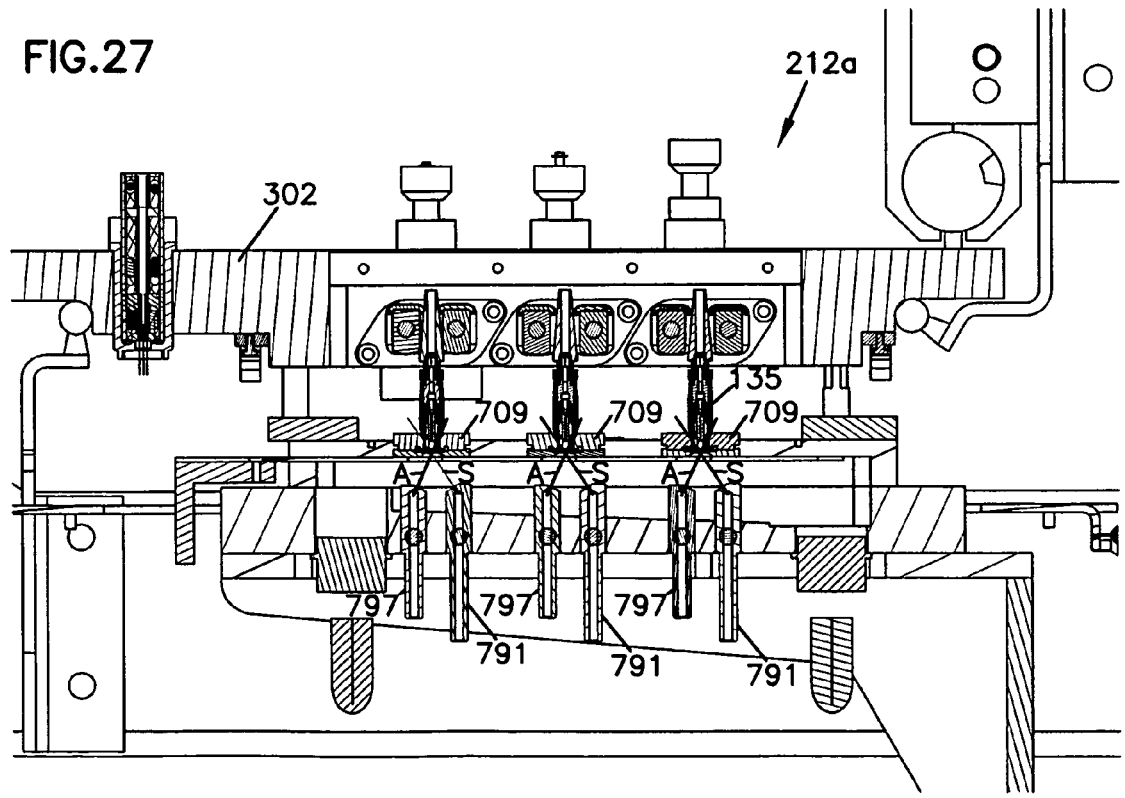
FIG. 27 is a cross-sectional view of a portion of the cleaning station of FIG. 25.
Figure 30B:
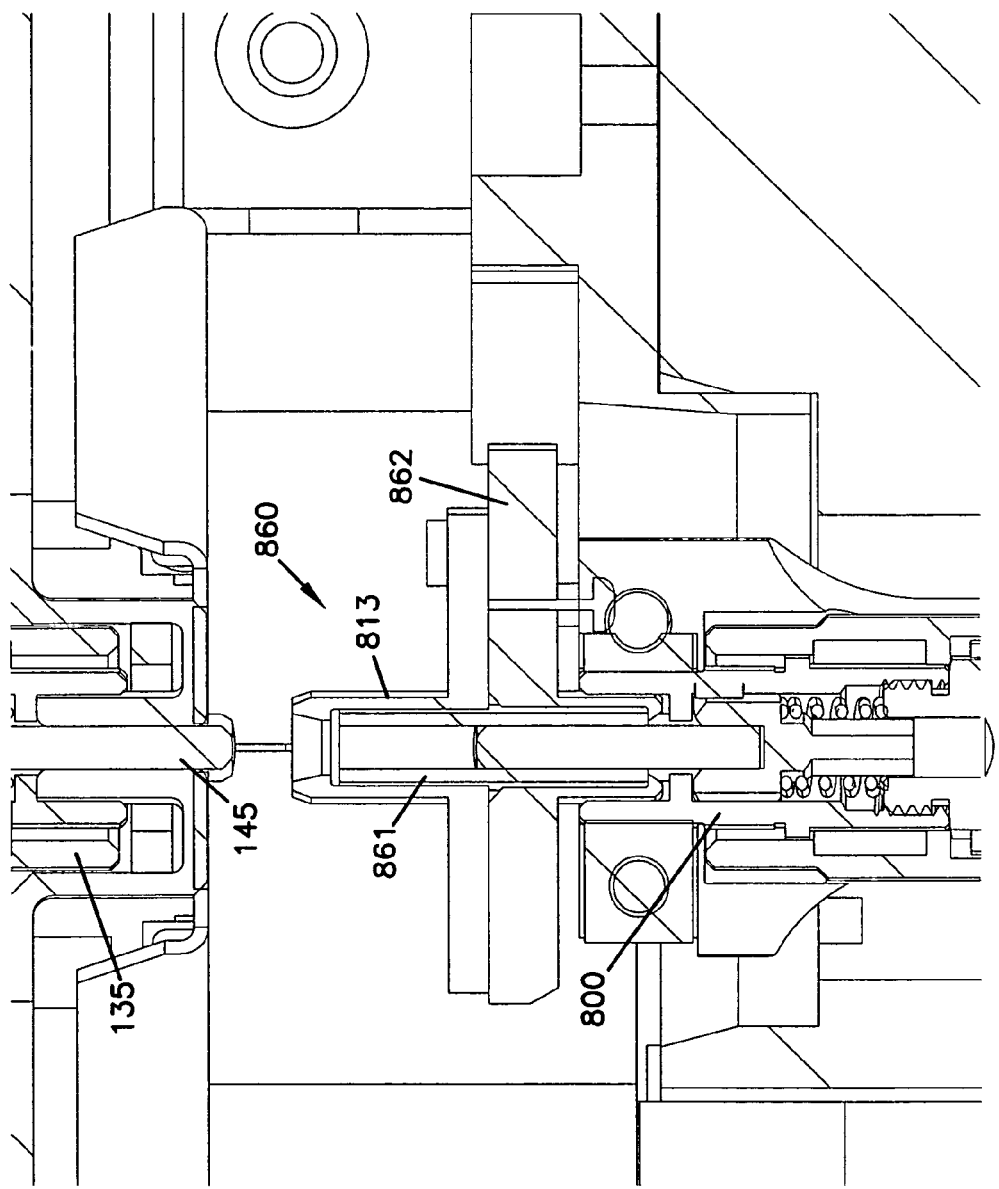
FIG. 30B is an enlarged view of a portion of the tuning station of FIG. 30A.
Figure 32:
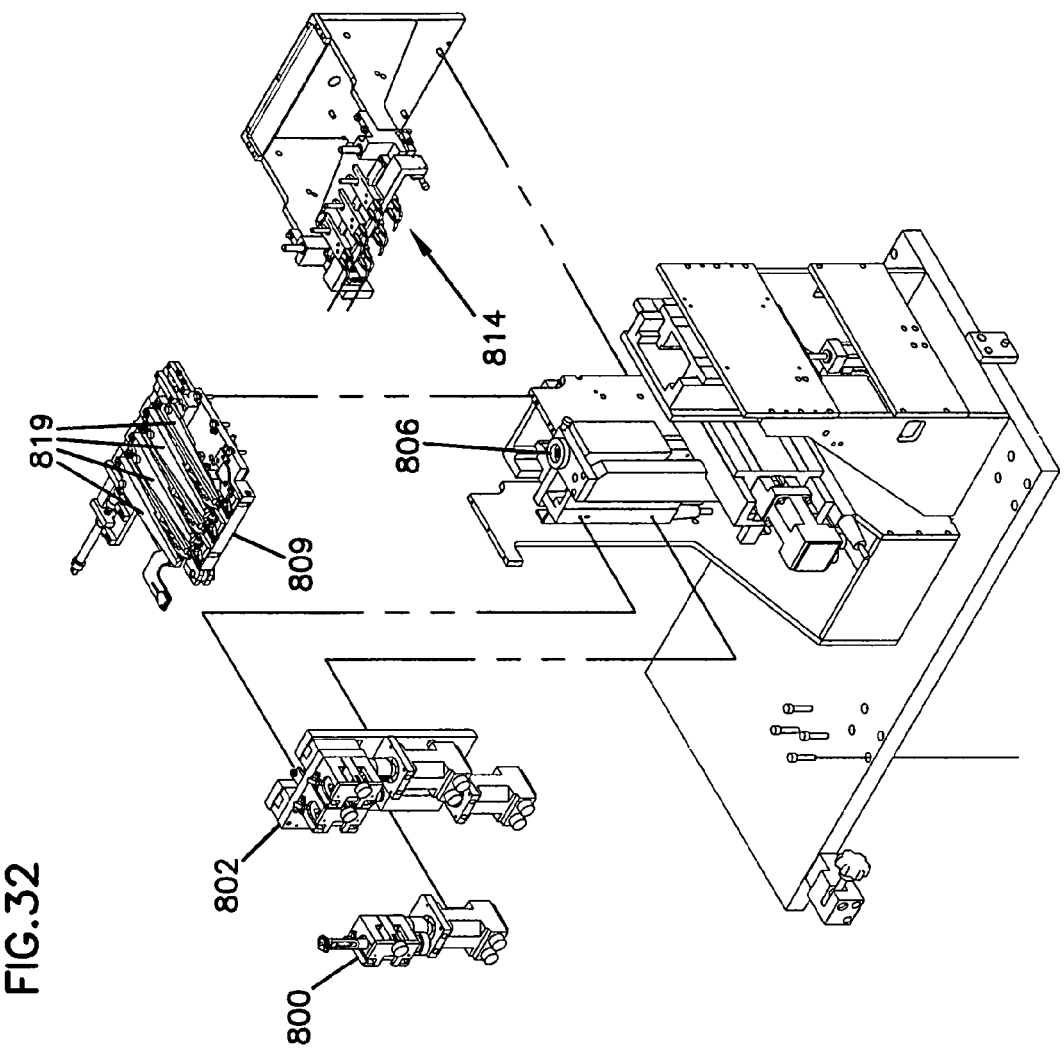
FIG. 32 is an exploded perspective view of portions of the example tuning station of FIG. 29.
Figure 31:
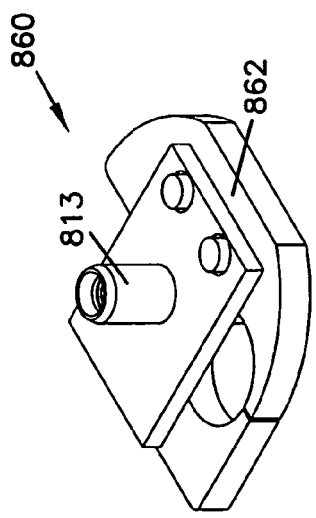
FIG. 31 is a perspective view of an example adaptor of the tuning station of FIG. 29.
Figure 33:
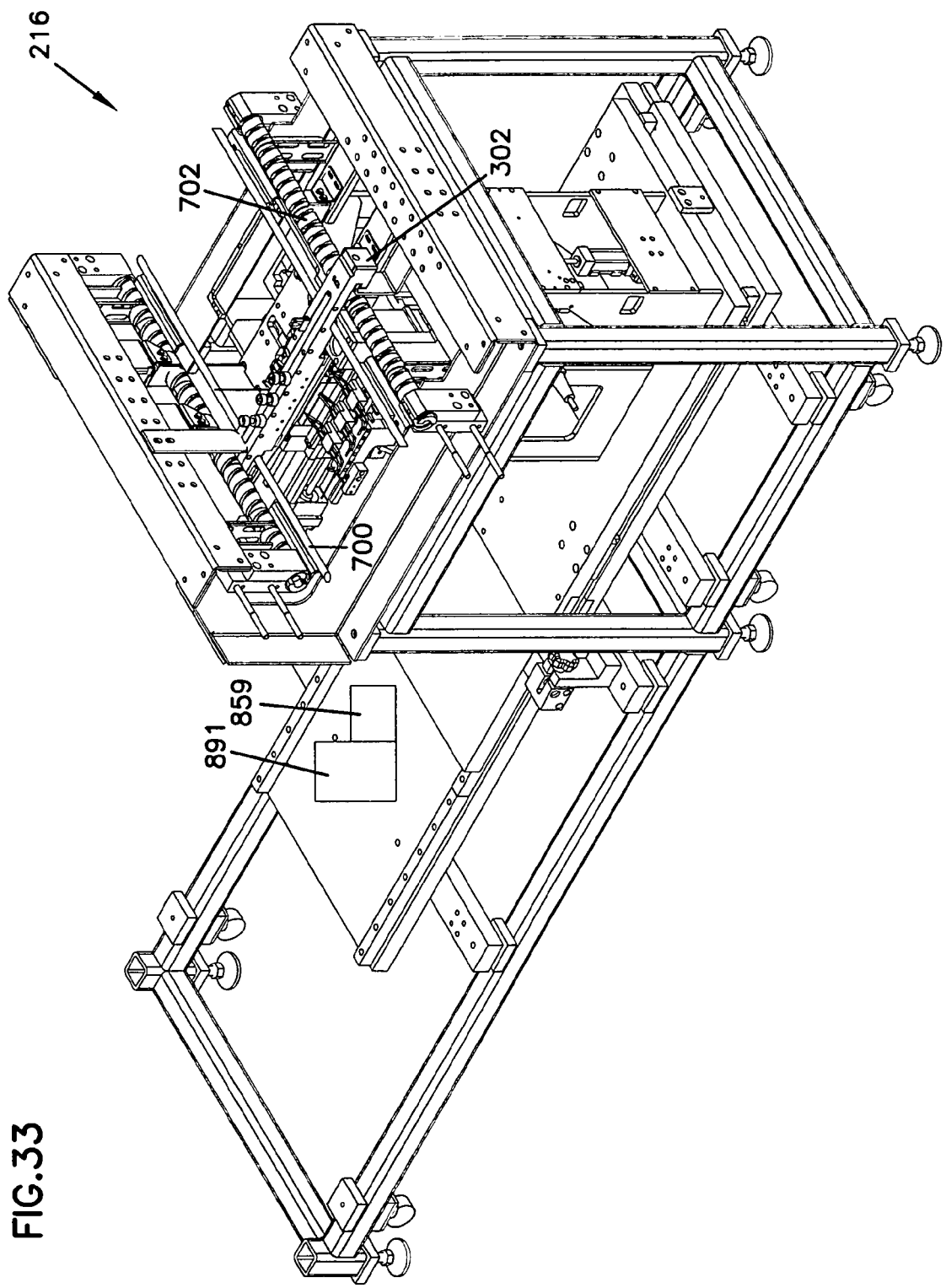
FIG. 33 is a perspective view of an example testing station.
Figure 34A:
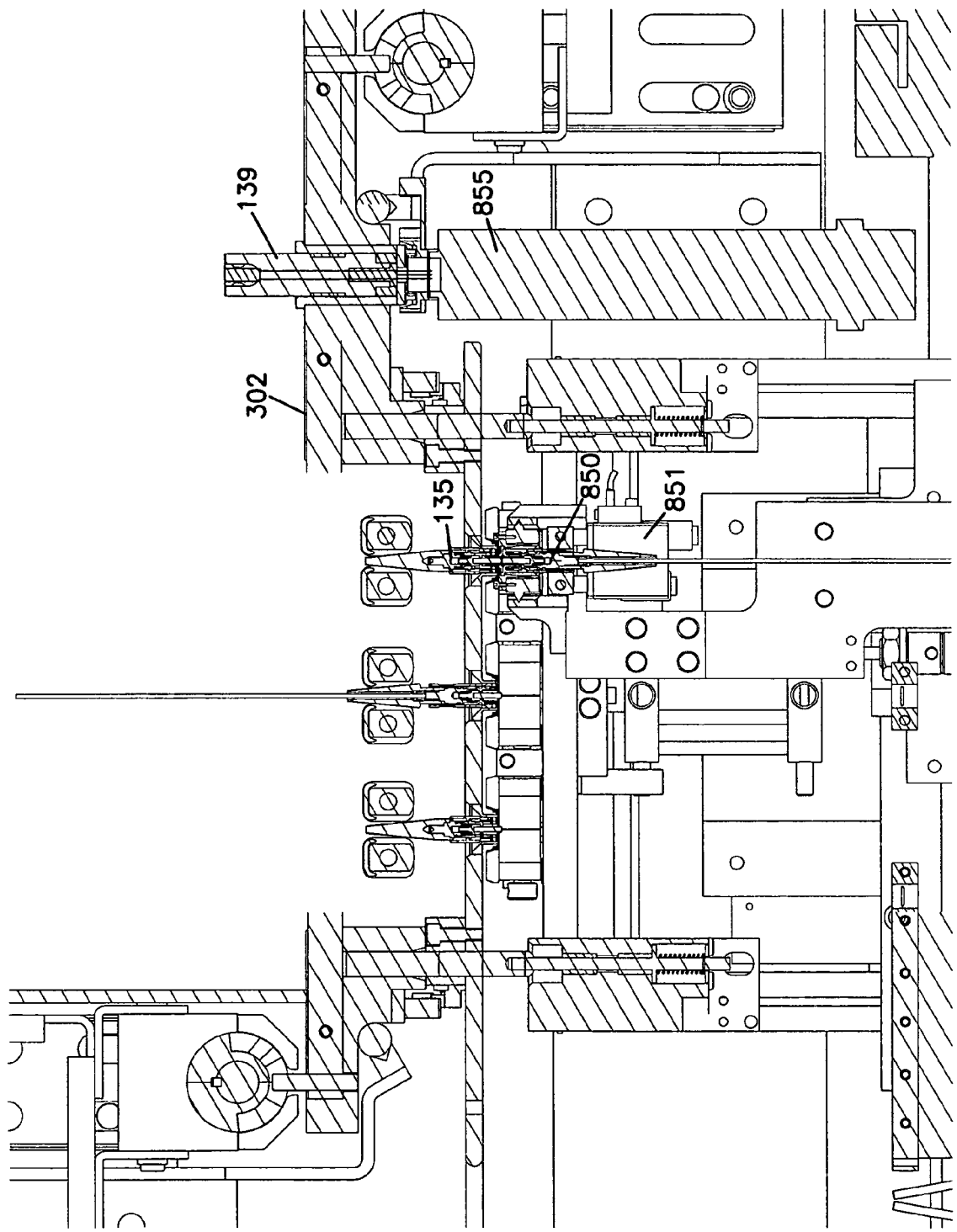
FIG. 34A is an enlarged view of a portion of the testing station of FIG. 34.
Figure 35:
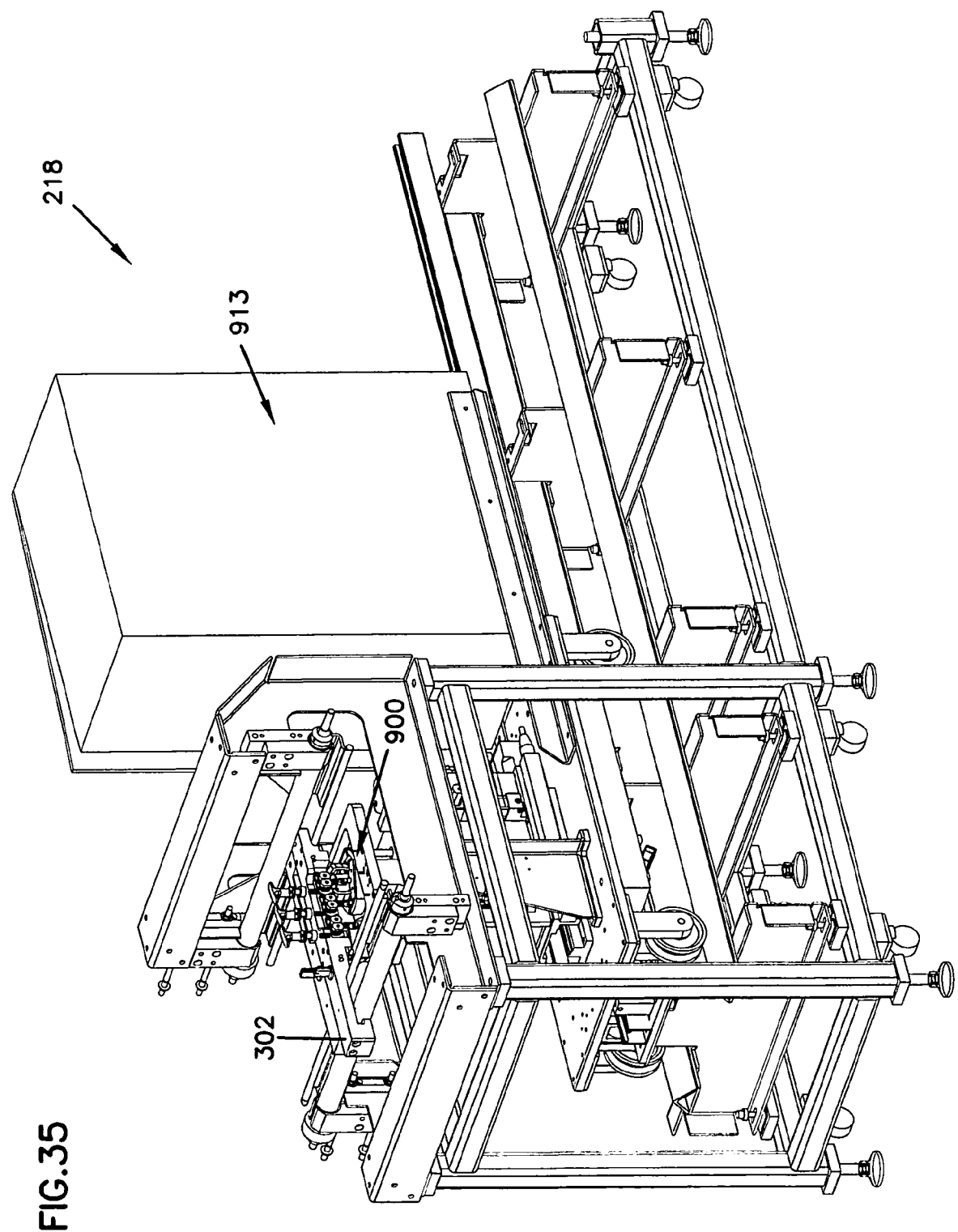
FIG. 35 is a perspective view of an example SC connector adjust station.
Figure 36:
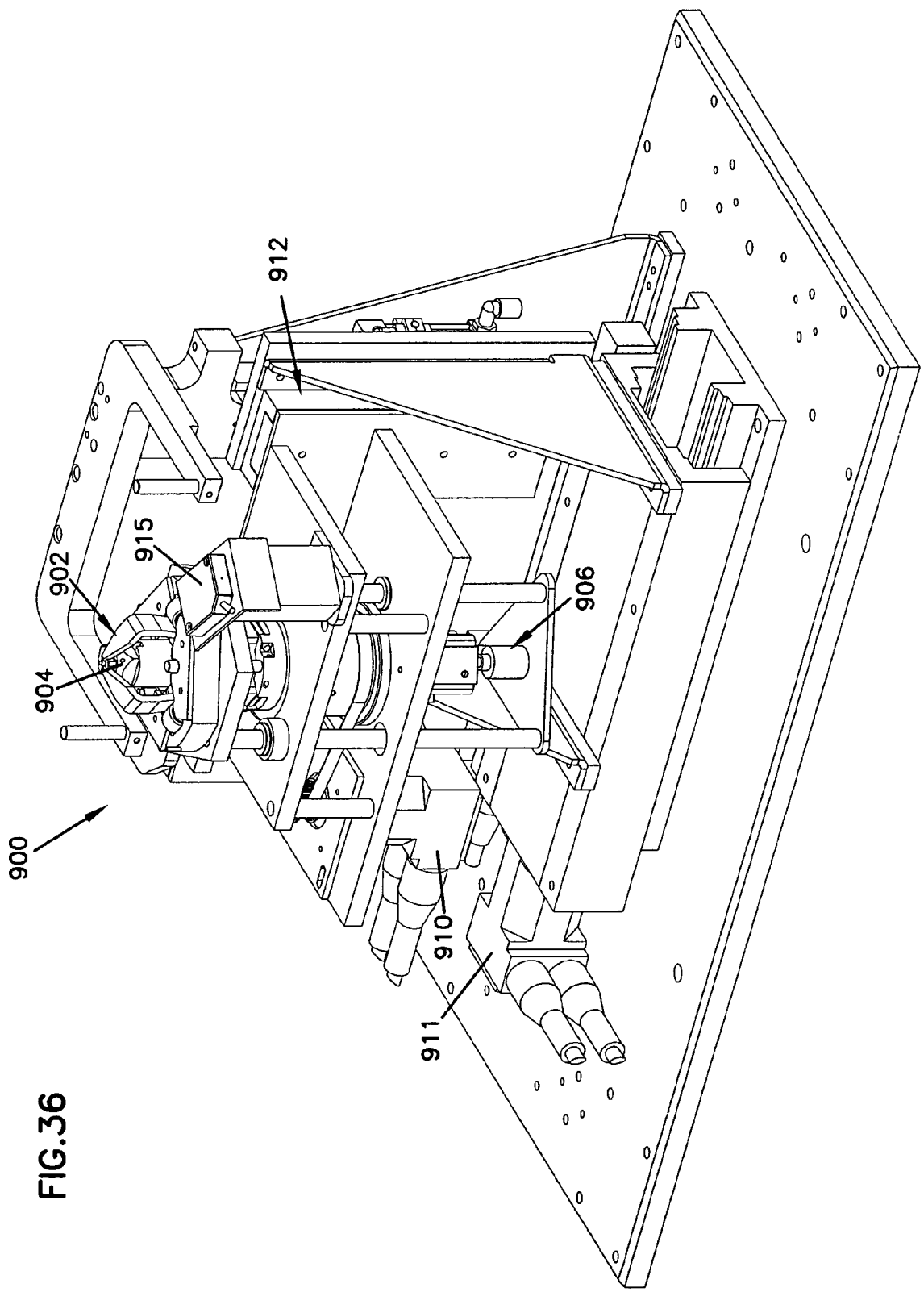
FIG. 36 is a perspective view of a portion of the SC connector adjust station of FIG. 35.
Figure 37:
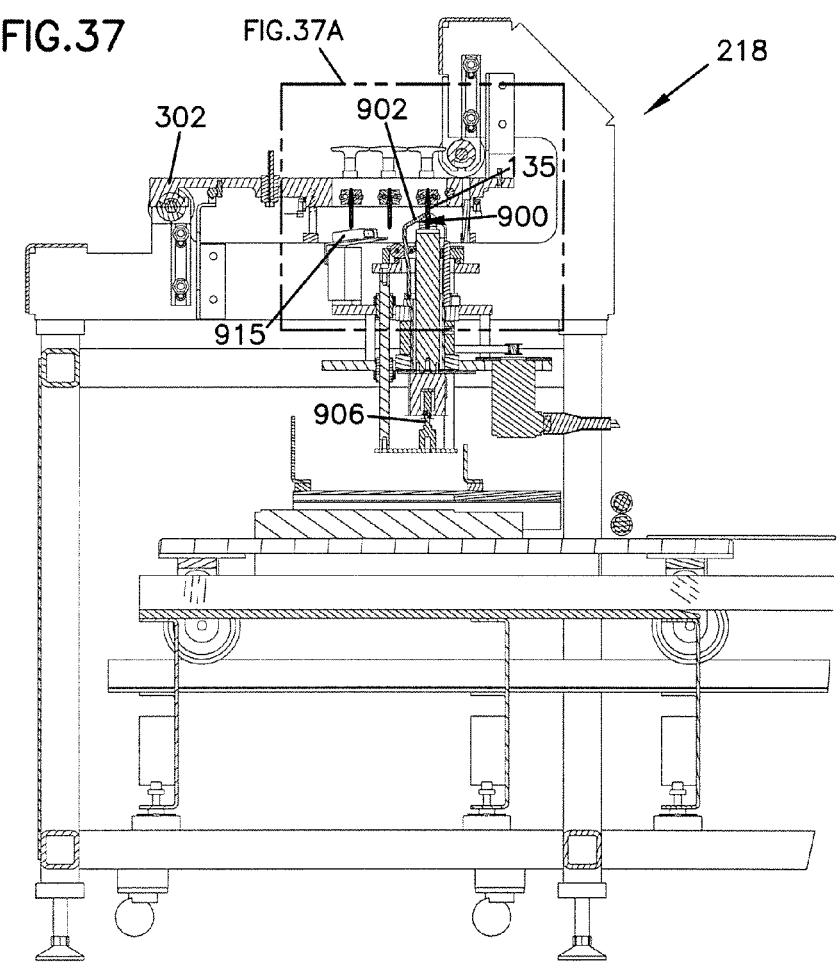
FIG. 37 is a cross-sectional view of the SC connector adjust station of FIG. 35.
Figure 37A:
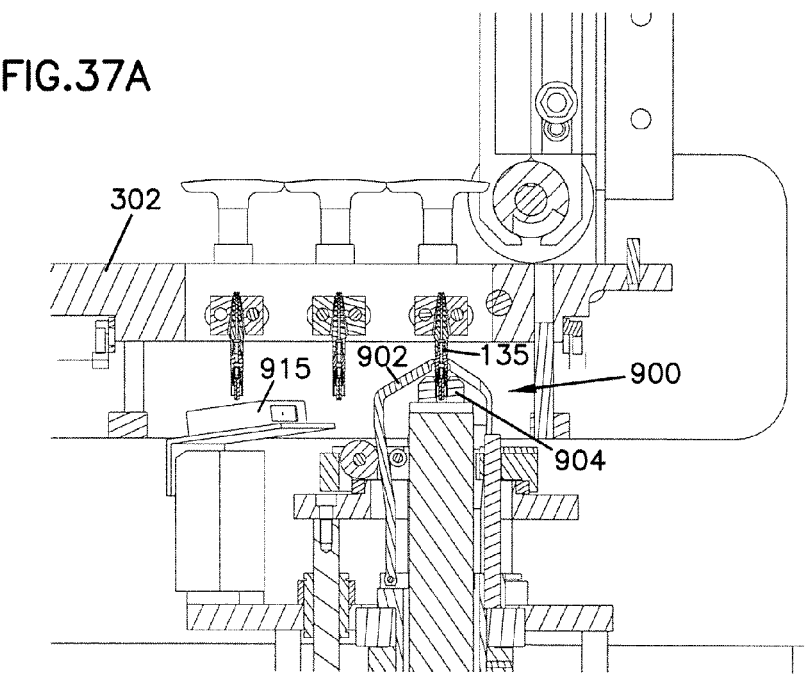
FIG. 37A is an enlarged view of a portion of the SC connector adjust station of FIG. 33.
Figure 38:
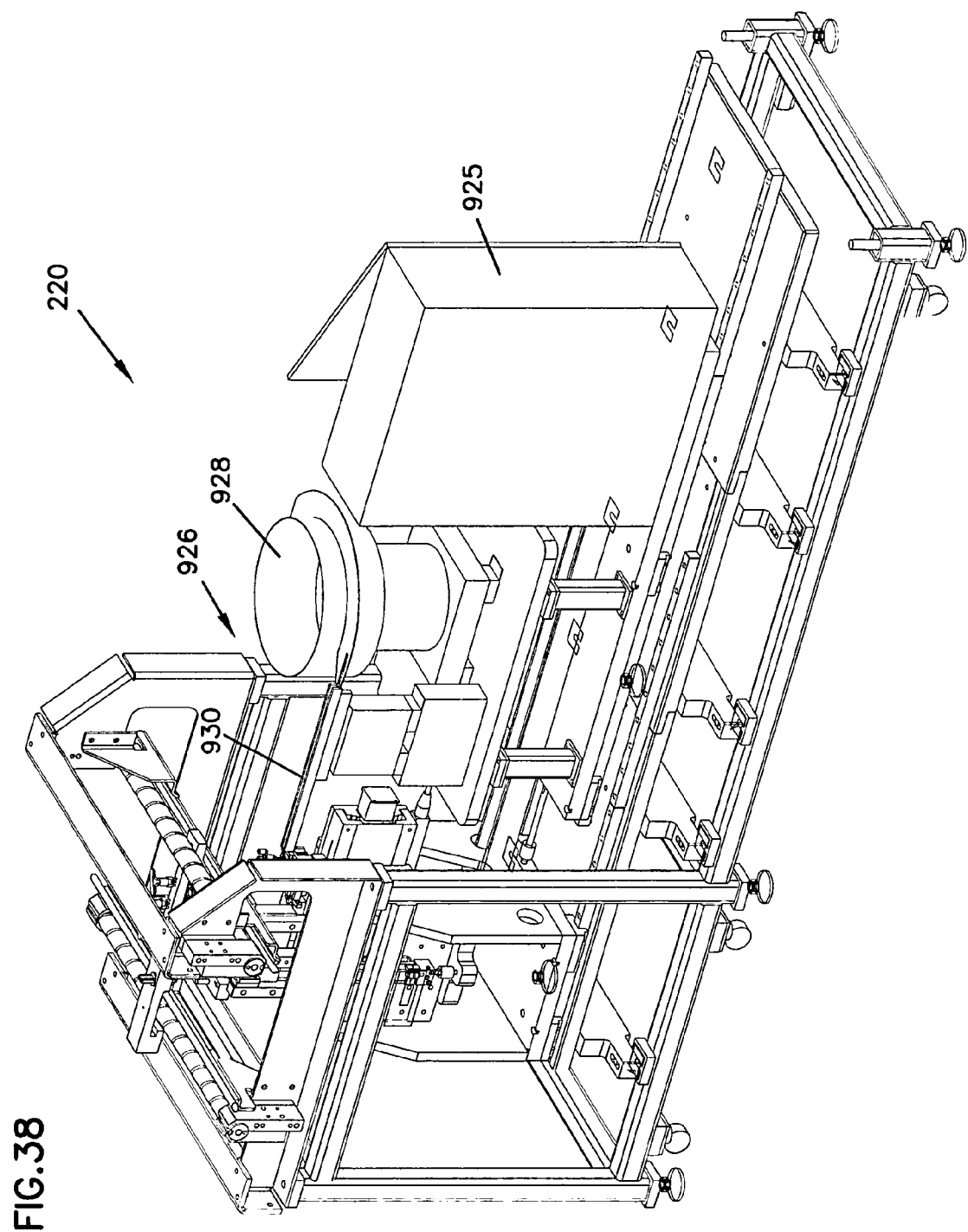
FIG. 38 is a perspective view of an example FC connector key press station.
Figure 39:
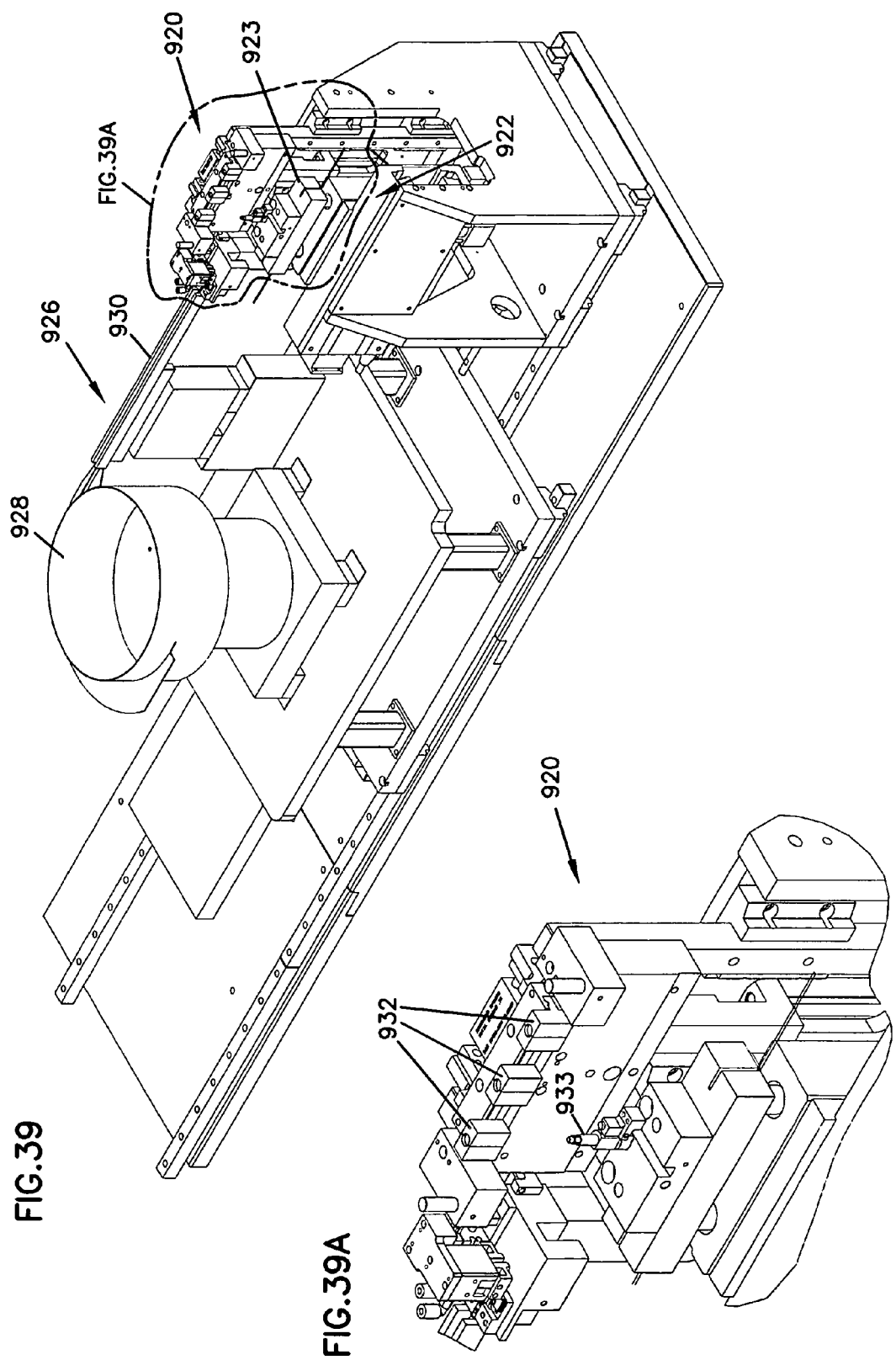
FIG. 39 is a perspective view of a portion of the FC connector key press station of FIG. 38.
Figure 40:
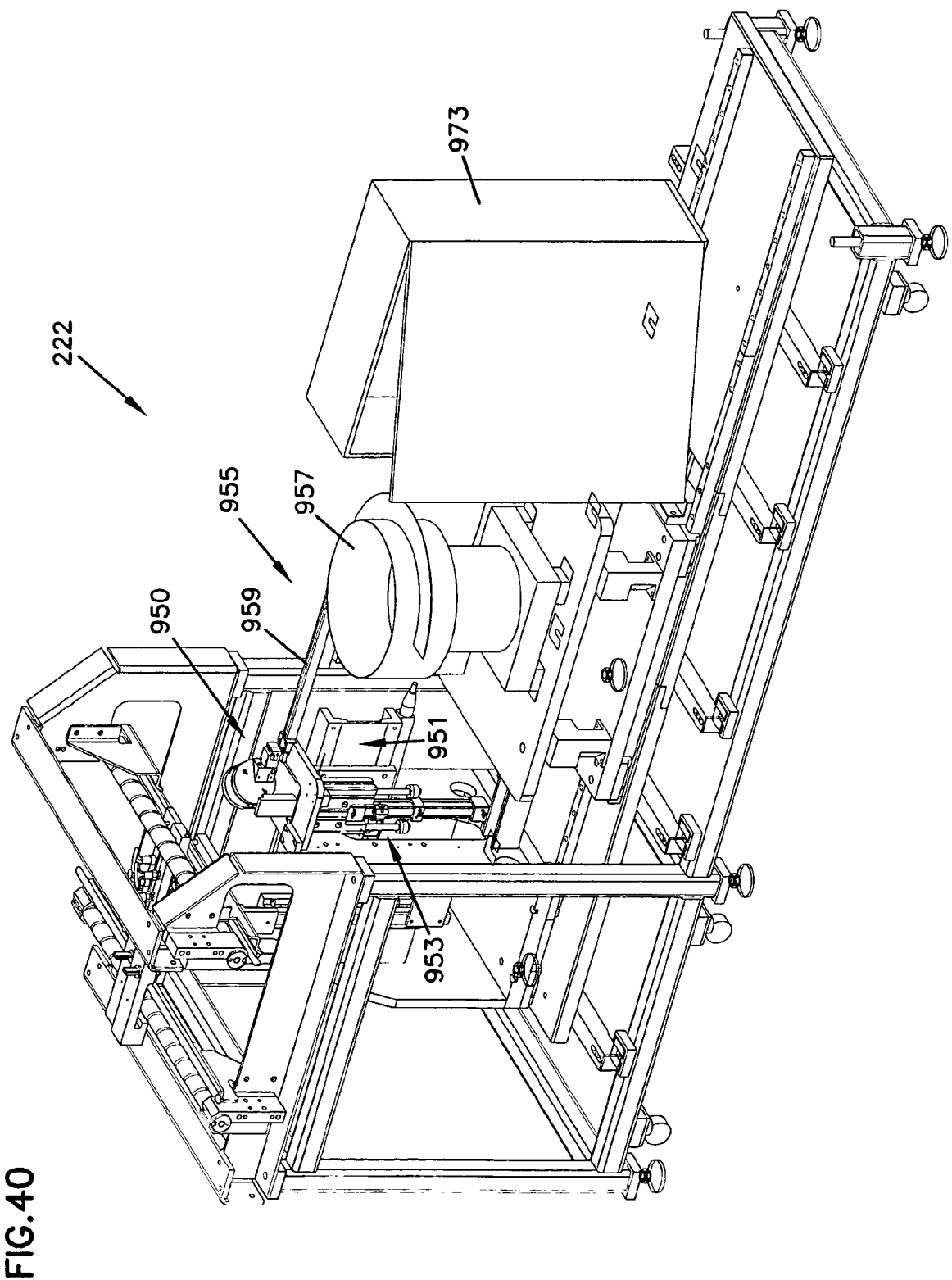
FIG. 40 is a schematic view of an example dust cap station.
Figure 41A:
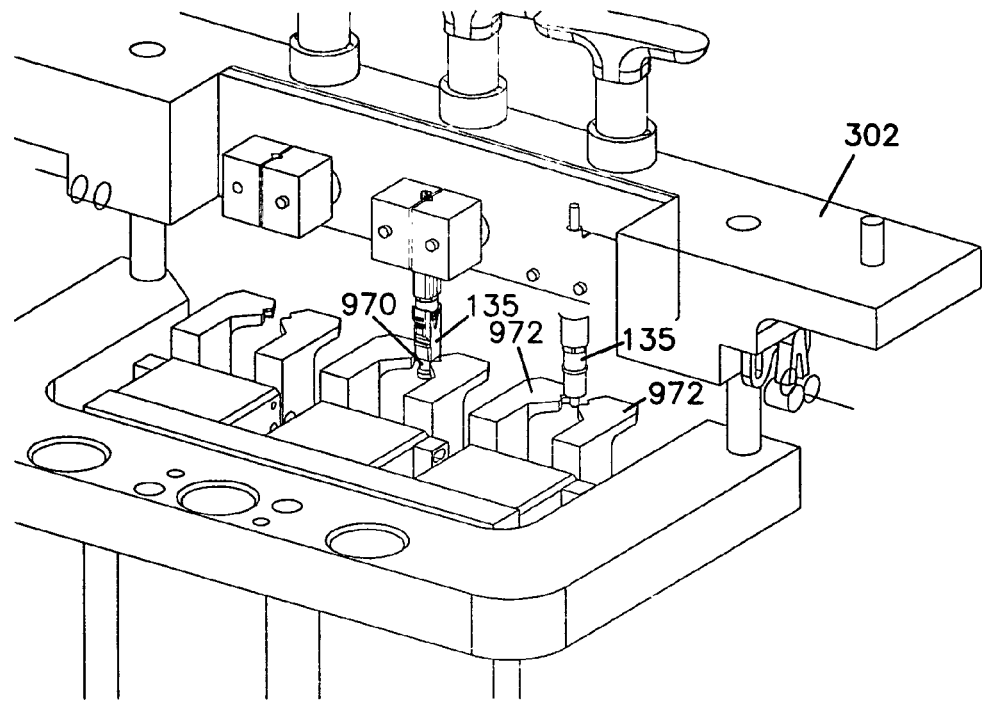
FIG. 41A is an enlarged perspective view of a portion of the dust cap station of FIG. 41.
Figure 42:
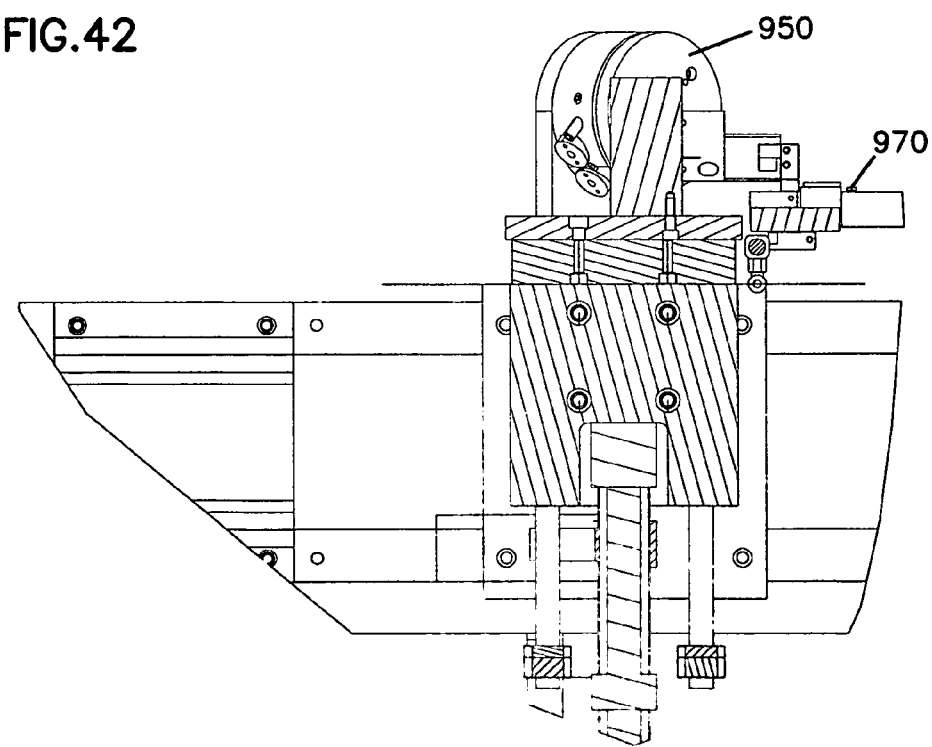
FIG. 42 is a cross-sectional view of a portion of the dust cap station of FIG. 40.

As shown at FIGS. 23, 24, and 24A, the screw drives 702 also preferably include flat regions 348 located at the polishing station 210. The flat regions 348 are positioned to correspond with the non-angled portions 701 of the slots 703. The flat regions 348 allow the pins 344, 346 of the fixtures 302 to be disengaged from the screw drives 702 during polishing operations, as described further below. After polishing, the non-angled portions 701 of the slots 703 allow the pins 344, 346 to be reengaged with the screw drives 702 upon revolution of the screw drives.

The screw drives 702 also include regions of increased slot pitch 705 before and after entering the flat regions 348 of the polishing station 210. See FIG. 24A. The increased pitch regions 705 provide an increased spacing between the group of fixtures 300 being polished at the polishing station 210, and fixtures 300 located before and after the polishing station 210. This spacing allows the group of fixtures 300 at the polishing station 210 to be moved longitudinally during polishing without contacting adjacent fixtures.

While a screw drive arrangement is preferred for conveying the fixtures, it will be appreciated that other types of drive mechanisms such as rack and pinion drives, chain drives, belt drives or other drives could also be used.

The screw drives 702 can be powered by a drive mechanism 707 such as one or more servo-motors. If a single servo-motor is used, belts or other torque transfer arrangements can be used to transfer torque from the servo to the screw drives 702 for turning the screw drives 702.

Figure 19A:
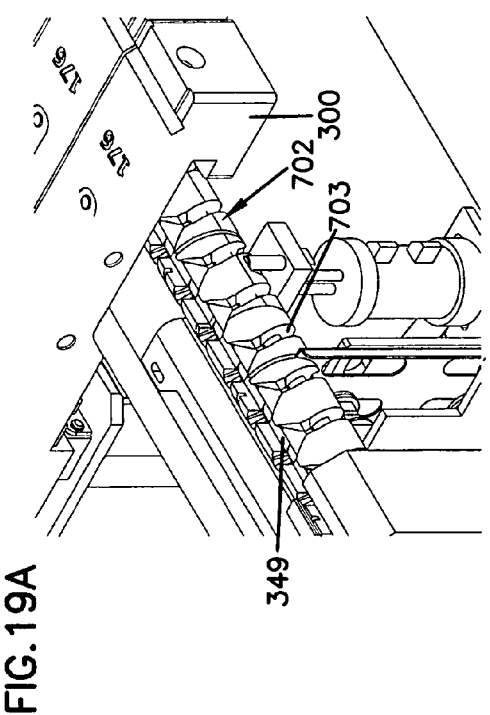
FIG. 19A is an enlarged view of a portion of the lead-in conveyor of FIG. 19.
Figure 20:
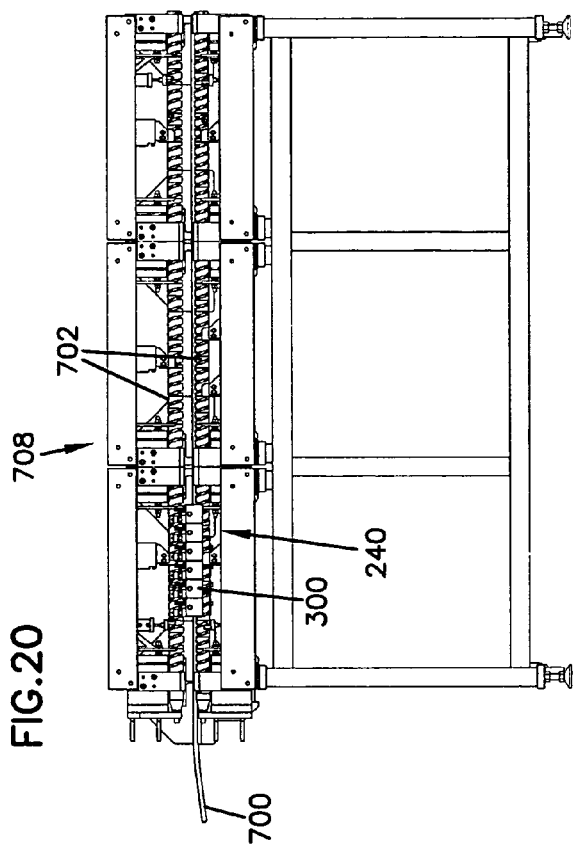
FIG. 20 is a front view of the lead-in conveyor of FIG. 19.
Figure 19:
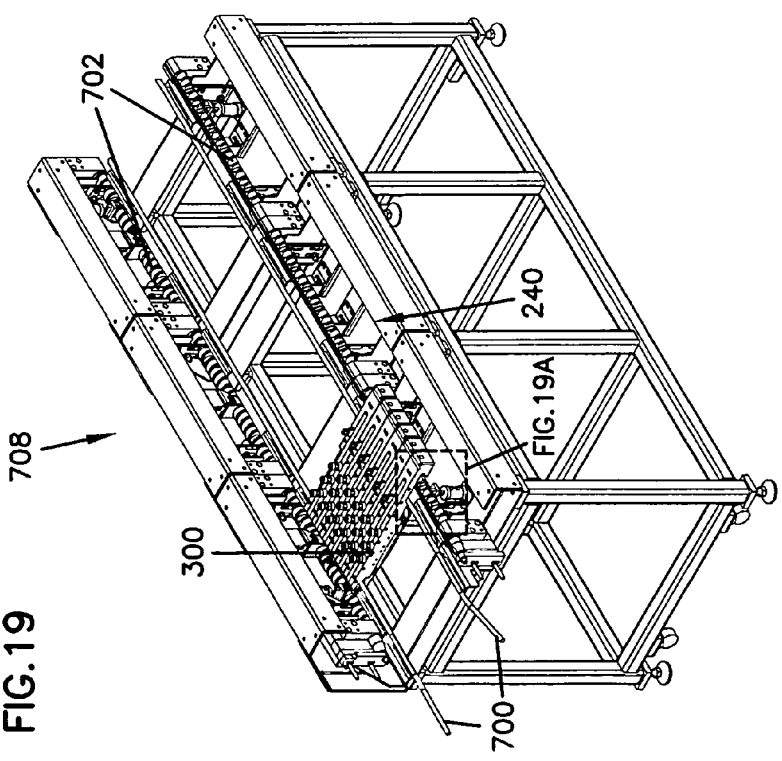
FIG. 19 is a perspective view of an example lead-in conveyor.
Figure 21:
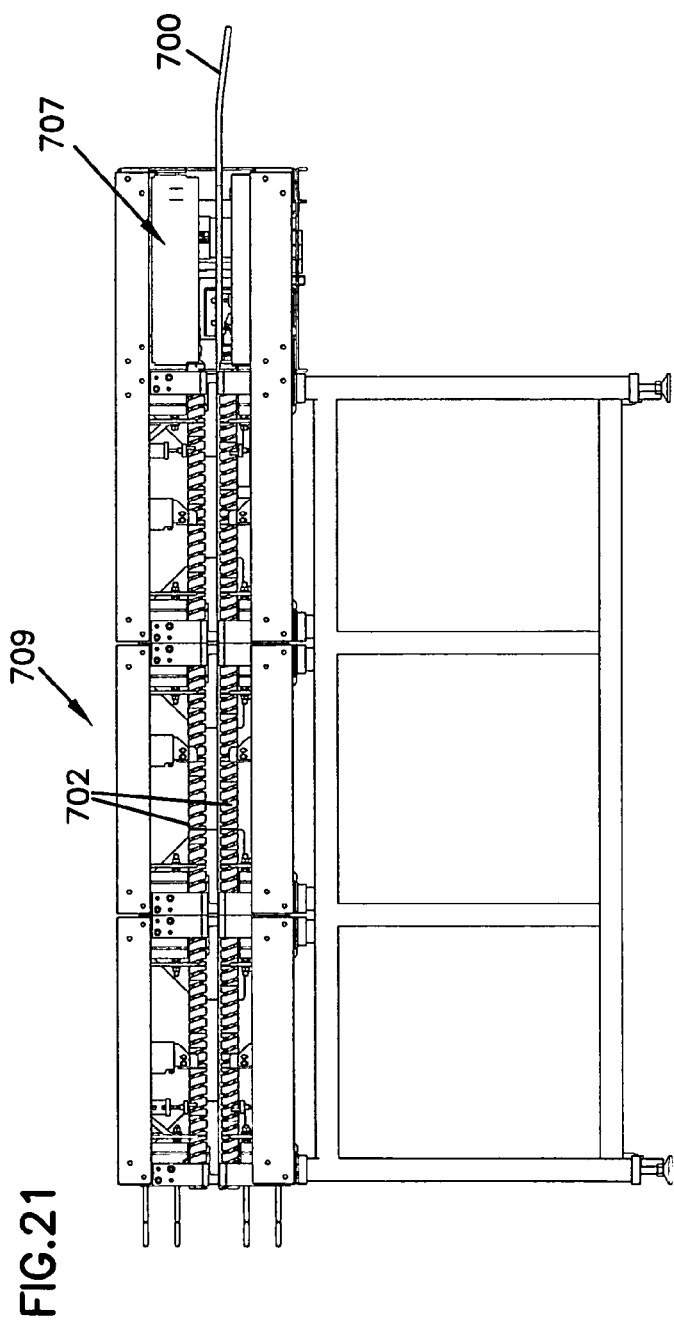
FIG. 21 is a front view of an example lead-out conveyor.

The fixture conveyor 240 can also include a lead-in section 708 and a lead-out section 709. See FIGS. 19–21. The lead-in and lead-out sections 708, 709 preferably have a length generally equal to at least one cart length. At the lead-in and lead-out sections 708, 709, straight longitudinal slots 349 can be formed in screw drives 702 to allow pins 344, 346 of fixtures 300 to slide therein, thereby facilitating engaging the fixture pins 344, 346 with the screw drives 702 as the cart 226 is lead into the assembly line, and to facilitate disengaging the fixture pins 344, 346 from the screw drives 702 as the cart 226 is lead out of the assembly line. See FIG. 19A.

e. Polishing Station

Figure 4A:
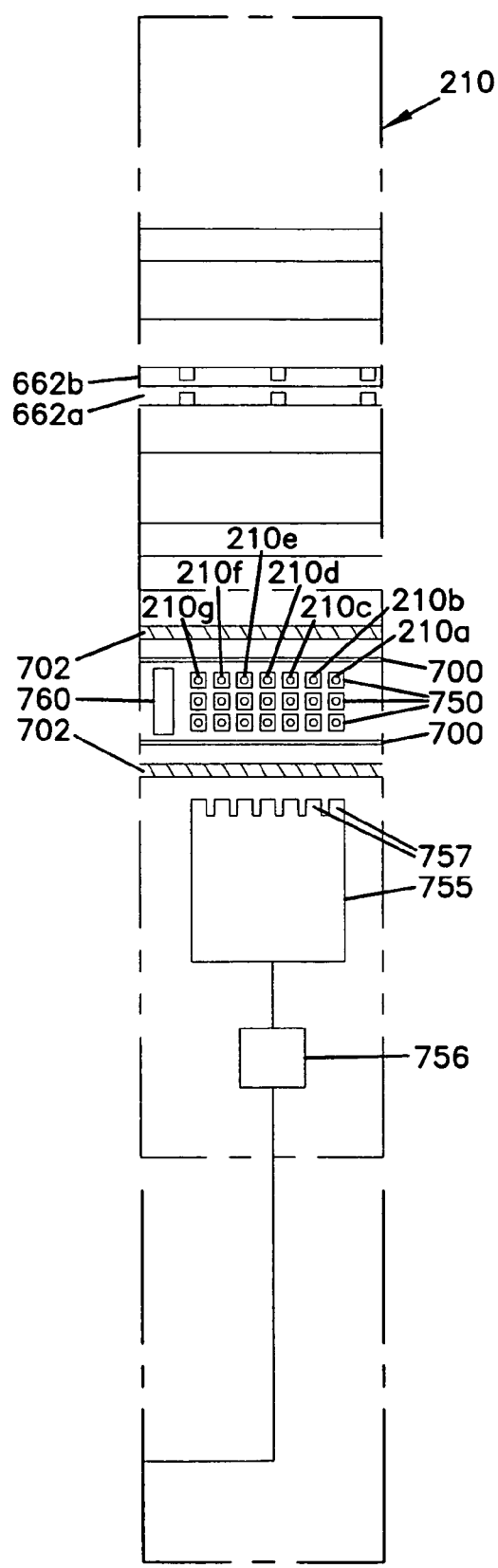
FIG. 4A is a schematic diagram of an example polishing station of the system of FIG. 4.
Figure 4B:
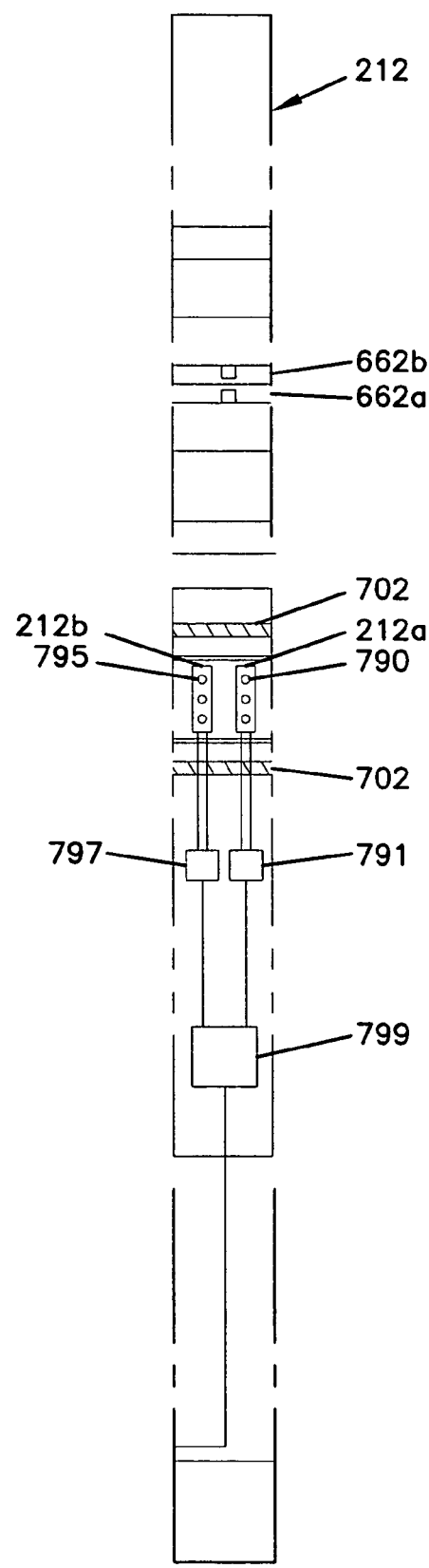
FIG. 4B is a schematic diagram of an example cleaning station of the system of FIG. 4.
Figure 4C:
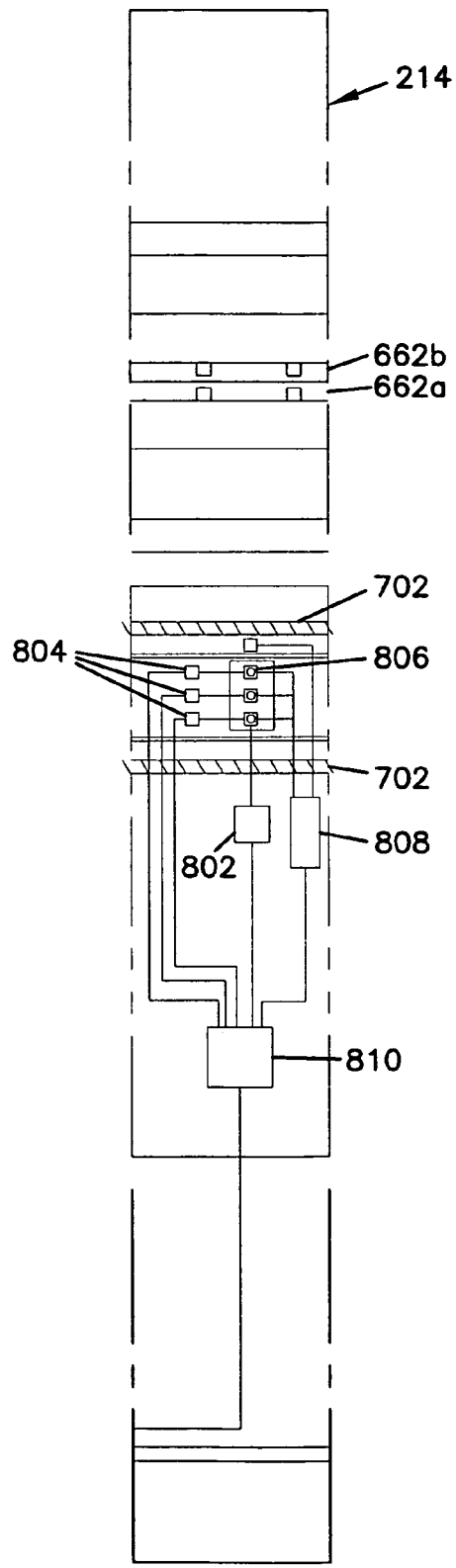
FIG. 4C is a schematic diagram of an example tuning station of the system of FIG. 4.
Figure 4D:
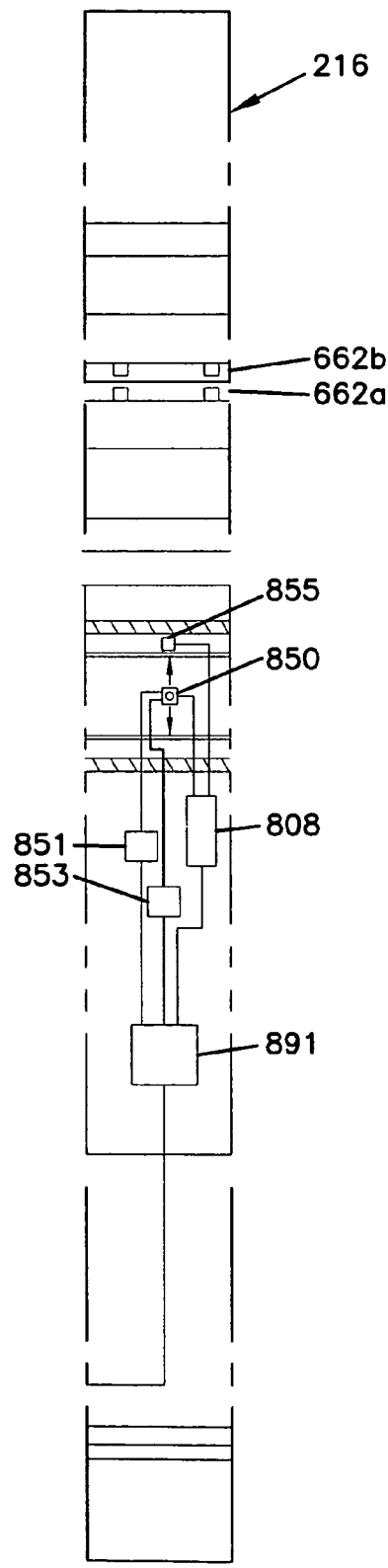
FIG. 4D is a schematic diagram of an example testing station of the system of FIG. 4.

Referring to FIGS. 4 and 4A, the depicted polishing station 210 includes a plurality of polishing substations 210a–210g. Each substation includes three polishing pads 750 that can be individually raised and lowered by separate lift mechanisms (e.g., pneumatic cylinders). Polishing films are positioned between the pads 750 and the ferrule end faces 147 of the ferrules 145 nested within the polishing fixtures 304 of the fixture assemblies 300.

By lifting the polishing pads 750, the polishing films are pressed into contact with the ferrule end faces 147. The various polishing substations 210a–210g can provide various polishing functions. For example, the substation 210a can provide an epoxy and hackle removal function. Later substations can provide radius and apex shaping functions.

The substations can utilize polishing films having increasingly fine grit sizes to provide the final polished end faces. The substations can provide a chemical mechanical polishing effect by using polishing films having reactive components. An example film material includes cerium oxide. Example polishing steps are disclosed in U.S. Pat. No. 6,599,030 to Millmann, which is hereby incorporated by reference.

The polishing station 210 can include a fluid injection system for cleaning the polishing films between polishing cycles. For example, the fluid injection system can include one or more jets that sprays de-ionized water interspersed in a stream of high-pressure air to remove debris and other unwanted particles from the polishing films.

The polishing station 210 also includes a drive mechanism 755 for moving the fixture assemblies 226 along a horizontal plane relative to the polishing films. The drive mechanism 755 can include an X-Y table. A controller 756 can be used to program the polishing mechanism 755 to move or oscillate the fixture assemblies 300 along predetermined polishing patterns. The drive mechanism 755 includes clamps 757 adapted to clamp on the extensions 316 of the polishing fixtures 304 to secure the fixture assemblies 300 to the drive mechanism 755. The drive mechanism 755 preferably simultaneously moves all of the fixture assemblies 300 at the polishing station 210 along the preprogrammed polishing pattern.

Further details regarding aspects of the polishing system can be found in U.S. patent application Ser. No. 10/356,358 to Bianchi, filed on Jan. 31, 2003 and entitled "Apparatus and Method for Polishing a Fiber Optic Connector," which is hereby incorporated by reference.

In operation of the polishing station 210, the fixture assemblies 300 are moved from substation to substation by the screw drives 702. When the fixture assemblies 300 reach each substation, the clamp 757 corresponding to the given substation clamps down on the extension 316 of the polishing fixture 304. When the fixture assemblies 300 are aligned with the substations, the screw drives 702 are positioned with the flats 348 oriented to not interfere with the fixture pins 344, 346. See FIGS. 24 and 24A. Therefore, the drive mechanism 755 can readily move the fixture assemblies 300 without interference from the screw drives 702. After a polishing sequence has been completed, the clamps 757 are released, the screw drives 702 are rotated, causing the pins 344, 346 to re-engage the slots 703, and the fixture assemblies 300 are moved to the subsequent polishing substation. Thereafter, the process is repeated until the polishing process is complete.

When the fixtures are moved along the fixture conveyor 240, the fixtures 300 ride along guide rails 700. As shown, for example, at FIGS. 7, 10, and 22, the guide rails 700 are adapted to ride against shoulder portions 321 of the tuning and test fixture 302 such that a mid-portion of the test and tuning fixture 302 is captured between the rails 700. The rails 700 include portions that pivot about points 710 located at the polishing station 210 (see FIGS. 24 and 24A). During polishing, the portions of rails 700 pivot about points 710 outwardly toward the corresponding screw drives 702 to provide clearance for allowing the fixtures 300 to be moved laterally by the drive mechanisms of 755 along the desired polishing pattern.

A stripping substation 760 is located at the end of the polishing station 210. At the stripping station 760, the polishing fixtures 304 are pulled downwardly from the tuning and test fixtures 302 to disengage the polishing fixtures 304 from the tuning and test fixtures 302 (e.g., by pulling downwardly on the polishing fixture 304 with sufficient force to flex the arms 310 of the latches 306 apart such that the arms 310 disengage from the retaining member 312, as shown in FIGS. 8 and 9). Once disengaged, the polishing fixtures 304 slide via gravity down a ramp into the storage bin for 460 of the cart 226. See FIG. 14. By removing the polishing fixture 304, improved access is provided to the connectors 135 for subsequent processing. Since the connectors are clamped at the boot 149, the lower ends of the connectors 135 are fully exposed and readily accessible from under the tuning and test fixtures 302.

f. Cleaning Station

Referring to FIGS. 4, 4B, and 25–28, the cleaning station 212 includes substations 212a, 212b for cleaning the ferrule end faces 147 of the connectors 135. The substation 212a includes steam recesses 790 into which the lower ends of the connectors 135 are inserted to expose the ferrules 145 to cleansing steam. Steam is provided to the steam recesses 790 by nozzles 791 that are connected to a steam source, and dry air is provided by nozzles 797. The substation 212b includes air stream recesses 795 into which the lower ends of the connectors 135 are inserted. The air stream recesses 795 are pneumatically coupled to a source of compressed gas. The source of compressed gas provides a pressurized gas stream to the recesses for cleaning the ferrules 145. In one embodiment, the pressurized gas includes carbon dioxide. Operation of the cleaning module 212 can be controlled by a controller 799 that interfaces with the main system controller 250.

In use, the fixture conveyor 240 advances a fixture 302 to substation 212a and the fixture stops at a position where the connectors 135 align with the steam recesses 790. The substation 212a is then actuated towards the fixture 302 until end faces 147 of the connectors 135 are positioned to extend into the recesses 790. See FIG. 27. Steam (see arrows S) is applied to the ferrules 145 of the connectors 135 by nozzles 791, and dry air is applied by nozzles 797 (see arrows A). Once the steam cleaning process is complete, fixture 302 is indexed to the substation 212b, where the connectors 135 are cleaned with air in a similar manner.

Referring to FIG. 28, in one embodiment, an air seal is used to seal the substations 212a, 212b when cleaning the connectors 135. When steam, illustrated by arrows S, is applied to the end faces 147 of connector 135 during cleaning at substation 212a, air is forced through passage 792 and out recess 790 surrounding the connector 135 (see arrows B). The air that is forced through passage 792 and out of recess 790 acts as a barrier to the steam and other debris removed from end faces 147 from exiting the substation 212a. In this manner, the portions of connector 135 located outside of the substation 212a are maintained in a clean condition.

After the air cleaning, the fixture 302 is moved to the tuning station 214.

g. Tuning Station

Referring to FIGS. 4, 4C, and 29–32, the tuning station 214 includes three master tuning connectors 800 and a remote test head 806 for use in inputting light into the connectors 135, and monitoring the light output through the bare fiber ends 137 held within the support sleeves 139. The tuning connectors 800 can be raised and lowered by a lift mechanism 802, and individually rotated by rotational drives 803. A conventional optical testing apparatus 808 is optically connected to the master tuning connectors 800 and the remote head 806. In one embodiment, the testing apparatus 808 includes a light member frame having product no. 8163A, a laser light source having product no. HP 81654A, a light meter having product no. 81618A, and a remote head having product no. 91623A, all being manufactured by Agilent Technologies of Palo Alto, Calif. In addition, a fiber optic switch (not shown) is used to switch the light signals entering the testing apparatus 808 so that the testing apparatus 808 can be used for all three master tuning connectors 800.

Intermediate adapters 860 are positioned between the tuning connectors 800 and the connectors 135 being processed. See FIGS. 30B and 31. The adapters 860 include a boss 813 that surrounds a split sleeve 861 sized to receive the ferrules of the tuning connector 800 and connector 135. A clamp 862 provides a compression force on the lower portion of the split sleeve 861 to retain the ferrule of the tuning connector 800 in the split sleeve 861 of the adapter 860.

A module controller 810 interfaces with the testing apparatus 808 and various other components to control operation of the station 214. The module controller 810 also interfaces with the with the main system controller 250. In addition, a machine controller 811 interfaces with the structural components of the station 214 to control movement of the various components of the station 214, such as lift mechanism 802 and rotational drives 803.

In use of the tuning station 214, the screw drive 702 conveys a fixture 302 to a position where the connectors 135 held by the fixture 302 are positioned directly above corresponding master tuning connectors 800. An alignment mechanism 814 is used to align the fixture 302 with respect to the station 214, and an alignment mechanism 809 is provided for retaining the ferrules of the connectors in direct alignment with the master tuning connectors 800. See FIG. 32. For SC connectors, fingers 819 are included on alignment mechanism 809 to prevent rotation of the connectors 135 during tuning.

Once the ferrules of the connectors 135 are aligned over the tuning connectors 800, the tuning connectors 800 are raised to provide optical connections with the connectors being processed. Adapters 860 provide the connection between the tuning connectors 800 and the connectors 135 being processed. The bare fiber ends held within the support sleeve 139 mounted within the receiver 342 of the fixture 302 are also optically coupled to the remote head 806.

Once the connectors 135 and the bare fiber ends 137 have been coupled to the test apparatus 808 respectively by the tuning connectors 800 and the remote head 806, the test apparatus 808 injects light through the tuning connectors 800 and into the connectors 135 being processed. From the connectors 135, the light travels through the optical fibers to which the connectors 135 are terminated and exits the fibers through the bare fiber ends 137 into the remote head 806. In this manner, by detecting the amount of light that is transferred from the connectors 135 to the bear ends 137 of the fibers, the testing unit 808 can determine the insertion loss or return loss rating for the connectors 135.

After testing the connectors 135 at a first rotational orientation, the master tuning connectors 800 are lowered by the lift mechanism 802, rotated an increment (e.g., 60 degrees) by the rotational drives 803, and then raised back up by the lift mechanism 802 to reconnect the tuning connectors 800 with the connectors 135. The testing device 808 is then used to test the connectors at the second rotational position. This process is repeated a plurality of times until each of the rotational positions of the connectors 135 have been tested for tuning purposes.

After this process has been completed, the various readings are compared to determine the appropriate key location. For SC connectors, the key locations of each of the connectors are stored in memory. For FC connectors, the boots 149 of the connectors 135 are released from the fixture clamps 330 while the connectors 135 remain in sleeves 861 of adapters 860. The rotational drives 808 are then used to turn the master cables 800 and associated adapters 860, which in turn causes the connectors 135 to individually rotate. Each connector 135 is rotated until the connector 135 is located at the tuned orientation, which is coordinated with subsequent processing at the FC connector key press station 270. The fixture clamps 330 are then reengaged on boots 149 of the connectors 135 to maintain the connectors 135 in the desired rotational orientation.

h. Test Station

Referring now to FIGS. 4, 4D, and 33–34A, the test station 216 includes a master test connector 850 that is moved up and down by a lift mechanism 851 and moved laterally by a lateral drive mechanism 853. The test station 216 also includes a test unit including a remote test head 855 that optically couples to the bare fiber ends of the connectors 135 held by the fixture 302. In one embodiment, the test unit 859 is an IQS-510P Industrial PC including an IQS-1700 laser, an IQS-3250 light meter, and an OHS-1700 remote head, all manufactured by EXFO of Quebec, Canada. The test station 216 further includes a fiber optic testing device 859 optically coupled to the master test connector 850 and the remote test head 855. A controller 891 interfaces with the various components and also with the main controller 250.

In use, the fixture conveyor 240 advances a fixture 302 to the test station 216. The master connector 850 is then moved from connector 135 to connector 135 by the lift and lateral drive mechanisms 851, 853. At each connector 135, the test unit is used to take return loss and insertion loss reading. The test results are stored in memory for use in identifying which connectors complied with acceptable return loss and insertion loss parameters.

i. SC Connector Adjust Station

As shown at FIGS. 4, 4E, and 35–37A, the SC connector adjust station 218 includes an adjust arrangement 900 having a clamp 902 and a connector body receiver 904. The SC connector adjust station 218 also includes a lateral drive 911 for moving the adjust arrangement 900 from connector to connector on a fixture 302, and a lift mechanism 912 for raising and lowering the adjust arrangement 900. See FIG. 36. The SC connector adjust station 218 further includes a rotational drive 910 for turning the clamp 902 relative to the connector body receiver 904, and a clamp actuator 906 for opening and closing the clamp 902. A controller 913 interfaces with the various components of the station and also interfaces with the main controller 250.

In use, the fixture conveyor 240 advances a loaded fixture 302 to the SC connector adjust station 218. Once the fixture is positioned at the station 218, the lateral drive 911 moves the adjust arrangement 900 laterally to a position beneath a first connector 135 held by the fixture 302. The lift mechanism 912 then lifts the adjust arrangement 900 to a position where a lower end of the connector 135 (e.g., housing 18 shown in FIG. 1) is nested within the connector body receiver 904 to prevent the housing from rotating, and the clamp 902 is aligned with a ferrule hub (e.g., hub assembly 20) of the connector 135. The clamp 902 then clamps on the ferrule hub of the connector 135. See FIGS. 37 and 37A.

Thereafter, the rotational drive 910 rotates the claim 902 and associated clamped ferrule relative to the housing of the connector 135 to adjust the ferrule relative to the key position of the housing. Preferably, the ferrule of the connector is rotated to a position where the key aligns with the tuned key position determined at the tuning station 214. Finally, once the ferrule of the connector 135 is in the desired rotational position, the clamp 902 releases the ferrule of the connector 135, and the lift mechanism 912 lowers the adjust arrangement 900. The adjust arrangement 900 is then moved by the lateral drive 911 from one to the other of the remaining two connectors 135 in fixture 302 and the same tuning process is repeated.

In the illustrated embodiment, a laser sensor 915 emits a laser that is trained on external features of the connector 135 such as the hub assembly 20. See FIG. 1. For example, the laser sensor 915 can be used to verify that the hub assembly 20 of the connector 135 has been rotated by the adjust arrangement 900.

j. FC Connector Key Press Station

Referring to FIGS. 4, 4F, and 38–39A, the FC connector key press station 220 includes a key holder 920 including clamps 932 for clamping each connector 135 prior to application of a key element (e.g., key 36 of FIG. 2), and a pin 933 for holding each key element prior to application. The key holder 920 is moved laterally by a lateral drive 922 and is raised up and down by a lift 923. The FC connector key press station 220 also includes a product handler 926 for feeding key elements to the key holder 920. The product handler 926 includes a bin 928 for holding the key elements and a feed mechanism 930 for feeding the key elements to the key holder 920. A controller 925 controls operation of the various components of the station and also interfaces with the main controller 250.

In use, the fixture conveyor 240 advances a loaded fixture 302 to the station 220. Prior to the fixture 302 reaching the station 220, the key holder 920 is moved so that pin 933 can accept a key from the product handler 926. When the fixture is positioned at the station 220, clamps 932 are closed to capture a portion of the housing of each connector 135. Lateral drive 922 moves the pin 933 of the key holder 920 to a position beneath a first FC connector 135 held by the fixture 302. The lift 923 then lifts the pin 933 of the key holder 920 to press the key onto the connector 135. Thereafter, the pin 933 of the key holder 920 returns to the product handler 926 to receive another key, and the process is repeated until all three connectors 135 held by the fixture 302 have been fitted with a key.

k. Dust Cap Installation Station

Referring to FIGS. 4, 4G, and 40–42, the dust cap station 222 includes a cap holder 950 that is laterally moved by a lateral drive 951 and is raised and lowered by a lift 953. The dust cap station 222 also includes a product handler 955 for conveying dust caps 970 (e.g., dust cap 42 of FIG. 2) to the dust cap holder 950. The product handler 955 includes a bin 957 for storing the dust caps 970 and a conveyor 959 for moving the dust caps from the bin 957 to a location where the dust caps can be picked up by the dust cap holder 950. A controller 973 controls operation of the components of the station and also interfaces with the main controller 250.

In use, the fixture conveyor 240 advances a loaded fixture 302 to the station 222. Prior to the fixture 302 reaching the station 222, the dust cap holder 950 is moved to accept a dust cap 970 from the product handler 955. When the fixture 302 is positioned at the station 222, alignment fingers 972 close to align the connector 135 relative to the dust cap holder 950 (see FIG. 41A), and the lateral drive 951 moves the dust cap holder 950 to a position beneath a first connector 135 held by the fixture 302. The lift 953 then raises the dust cap holder 950 to press the dust cap 970 onto the connector 135. Thereafter, the dust cap holder 950 returns to the product handler 955 to receive another dust cap 970, and the process is repeated until all three connectors 135 held by the fixture 302 have been fitted with a cap 970.

In one embodiment, connectors 135 that fail at any station of system 200 (e.g., receive a failing rating at the test station 216) are not fitted with a dust cap 970. In this manner, the absence of a dust cap 970 functions as an indicator for allowing an operator to know which connectors 135 failed and which are in need of reprocessing.

What is claimed is:

1. A fixture for a system for processing fiber optic connectors, the fixture comprising:
    a first portion including a plurality of clamps, each clamp being configured to clamp onto one of a plurality of fiber optic connectors; and
    a second portion defining a plurality of nests, each nest defining an aperture configured to allow a ferrule of one of the plurality of fiber optic connectors to extend therethrough;
    wherein the second portion is coupled to the first portion; and
    wherein the second portion is detachably coupled to the first portion using at least one latch, the latch including a spring.

2. The fixture of claim 1, wherein the aperture defined by each of the plurality of nests forms a close tolerance fit with the respective ferrule of one of the plurality of fiber optic connectors.

3. The fixture of claim 1, wherein each of the plurality of nests further includes a boss extending coaxially from the aperture, the boss being configured so that the ferrule of each of the plurality of fiber optic connectors extends approximately a same distance from a bottom of the second portion.

4. The fixture of claim 1, wherein each clamp is configured to be coupled to a respective boot of one of the plurality of fiber optic connectors.

5. A fixture for an automated system for processing fiber optic connectors, the fixture comprising:
    an upper portion including a plurality of clamps, each clamp including first and second clamp members, at least one of the first and second clamp members being configured to move between open and closed positions, and a resilient member being coupled to each of the first and second clamp members to hold a respective boot of one of a plurality of fiber optic connectors, the first and second clamp members each defining a recessed portion, and each respective resilient member being positioned in each respective recessed portion; and
    a lower portion defining a plurality of nests, each nest being configured to receive a ferrule of one of the plurality of fiber optic connectors;
    wherein the lower portion is detachably coupled to the upper portion.

6. The fixture of claim 5, wherein each of the nests defines an aperture that forms a close tolerance fit with the respective ferrule of one of the plurality of fiber optic connectors.

7. The fixture of claim 5, wherein the lower portion defines at least two drive pins configured to be coupled to a drive mechanism of the system.

8. The fixture of claim 5, wherein the first and second clamp members of each clamp hold a boot of one of the plurality of fiber optic connectors therebetween.

9. The fixture of claim 5, wherein, upon uncoupling of the lower portion from the upper portion of the fixture, a lower portion of each of the plurality of fiber optic connectors is exposed.

10. A method for processing fiber optic connectors, comprising:
    coupling a plurality of fiber optic connectors to a fixture, the fixture including a first portion and a second portion;
    processing the fiber optic connectors to a first processed state;
    removing the second portion of the fixture; and
    processing the fiber optic connectors to a second processed state.

11. The method of claim 10, wherein the coupling step further comprises:
    placing a ferrule of each of the plurality of fiber optic connectors into one of a plurality of nests defined by the second portion of the fixture; and
    coupling each of a plurality of clamps of the first portion of the fixture onto a boot of one of the plurality of fiber optic connectors.

12. The method of claim 11, wherein the step of coupling further comprises actuating opposing clamp members of each of the plurality of clamps from an open to a closed position to hold the respective boot of one of the plurality of fiber optic connectors.

13. The method of claim 10, wherein the first processed state is a polished state, and wherein the second processed state is a tuned state.

14. The method of claim 10, further comprising coupling the first portion to the second portion of the fixture by placing the first portion on top of the second portion.

15. A method for processing fiber optic connectors, comprising:
    providing a fixture including an upper portion and a lower portion;
    positioning each ferrule of a plurality of fiber optic connectors in one of a plurality of nests defined by the lower portion of the fixture;
    clamping the plurality of connectors to the upper portion of the fixture;
    polishing the ferrule of each of the plurality of fiber optic connectors; and
    stripping the lower portion from the upper portion of the fixture to provide access to a lower portion of each of the plurality of fiber optic connectors after the ferrules have been polished.

16. The method of claim 15, wherein the step of clamping further comprises actuating opposing clamp members of each of the plurality of clamps from an open to a closed position to hold a boot of one of the plurality of fiber optic connectors.

17. The method of claim 15, further comprising accessing the lower portion of each of the plurality of fiber optic connectors to tune each of the fiber optic connectors.

* * * * *